(12) United States Patent
Sasako et al.

(10) Patent No.: US 6,309,080 B1
(45) Date of Patent: *Oct. 30, 2001

(54) SURFACE LIGHT SOURCE DEVICE AND LIQUID CRYSTAL DISPLAY

(75) Inventors: Hiromi Sasako, Tokyo; Kayoko Watai, Saitama, both of (JP)

(73) Assignees: Enplas Corporation, Saitama; Yasuhiro Koike, Kanagawa, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/622,204

(22) Filed: Mar. 27, 1996

(30) Foreign Application Priority Data

Mar. 31, 1995 (JP) .................................... 7-097453

(51) Int. Cl.⁷ ................ G02F 1/335; F21V 7/04
(52) U.S. Cl. ............ 362/31; 362/331; 362/339; 362/330; 362/26; 349/64; 349/65
(58) Field of Search ............. 362/26, 31, 331, 362/339, 330, 268; 349/65, 62, 64

(56) References Cited

U.S. PATENT DOCUMENTS

| | | | |
|---|---|---|---|
| 5,102,227 | * 4/1992 | Zwirner ................. | 362/26 |
| 5,386,347 | * 1/1995 | Matsumoto ............ | 362/31 |
| 5,394,255 | * 2/1995 | Yokota et al. ........ | 362/31 |
| 5,467,208 | * 11/1995 | Kokawa et al. ...... | 362/26 |
| 5,542,017 | 7/1996 | Koike . | |
| 5,552,907 | * 9/1996 | Yokota et al. ........ | 362/31 |
| 5,598,280 | * 1/1997 | Nishio et al. ......... | 362/31 |
| 5,600,455 | * 2/1997 | Ishikawa et al. ..... | 362/31 |
| 5,659,410 | * 8/1997 | Koike et al. .......... | 362/31 |
| 5,735,590 | * 4/1998 | Kashima et al. ..... | 362/31 |
| 5,982,540 | * 11/1999 | Koke et al. ........... | 362/31 |

FOREIGN PATENT DOCUMENTS

| | | |
|---|---|---|
| 07134298 A | 5/1995 | (JP) . |
| 07198956 A | 8/1995 | (JP) . |
| 07270708 A | 10/1995 | (JP) . |
| 07270709 A | 10/1995 | (JP) . |
| 08234203 A | 9/1996 | (JP) . |
| WO 95/03559 | 2/1995 | (WO) . |

* cited by examiner

Primary Examiner—Thomas M. Sember
(74) Attorney, Agent, or Firm—Staas & Halsey LLP

(57) ABSTRACT

A surface light source device has a narrowed visual field and increased brightness. The surface light source device can be applied to a liquid crystal display. The back side of a fluorescent lamp is covered with silver foil. Light emitted from the lamp enters a wedge-shaped light guide plate through its incident surface. The light guide plate is designed so that directional light exits from the guide plate. When the light is guided toward a thin-walled end surface through the light guide plate, the light is scattered, reflected, and undergoes other action. Collimated light flux gradually exits from the exiting surface. The light flux passes through two prism sheets successively. As a result, the direction of propagation of the light is restricted in two dimensions. The light flux of increased brightness is directed to the liquid crystal panel. V-shaped channels formed in the prism faces of the two prism sheets PS1, PS2 are arrayed in two mutually perpendicular directions while facing outward. The prismatic vertical angles of the two sheets PS1, PS2 have various desirable combinations of values. For example, where the first sheet PS1 is disposed vertical to the lamp, the vertical angles of the two sheets PS1, PS2 are preferably 90° and 70°, respectively.

8 Claims, 18 Drawing Sheets

1st; VERT. ANG. 90°; GRV. OUTWD & PAR. TO LAMP
2nd; VERT. ANG. 70°; GRV. OUTWD & PERP. TO LAMP

ANGULAR EMITTING CHARACTERISTICS
(IN LAMP-PAR. PLANE; COS CORRECTED)

1st; VERT. ANG. 90°; GRV. OUTWD & PAR. TO LAMP
2nd; VERT. ANG. 70°; GRV. OUTWD & PERP. TO LAMP

ANGULAR EMITTING CHARACTERISTICS
(IN LAMP-PERP. PLANE; COS CORRECTED)

1st; VERT. ANG. 90°; GRV. OUTWD & PERP. TO LAMP
2nd; VERT. ANG. 70°; GRV. OUTWD & PAR. TO LAMP

ANGULAR EMITTING CHARACTERISTICS
(IN LAMP-PAR. PLANE; COS CORRECTED)

1st; VERT. ANG. 90°; GRV. OUTWD & PERP. TO LAMP
2nd; VERT. ANG. 70°; GRV. OUTWD & PAR. TO LAMP

ANGULAR EMITTING CHARACTERISTICS
(IN LAMP-PERP. PLANE; COS CORRECTED)

1st; VERT. ANG. 70°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PAR. PLANE; COS CORRECTED)

1st; VERT. ANG. 70°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PERP. PLANE; COS CORRECTED)

1st; VERT. ANG. 70°; GRV. OUTWD & PERP. TO LAMP
2nd; VERT. ANG. 90°; GRV. OUTWD & PAR. TO LAMP

ANGULAR EMITTING CHARACTERISTICS
(IN LAMP-PAR. PLANE; COS CORRECTED)

1st; VERT. ANG. 70°; GRV. OUTWD & PERP. TO LAMP
2nd; VERT. ANG. 90°; GRV. OUTWD & PAR. TO LAMP

ANGULAR EMITTING CHARACTERISTICS
(IN LAMP-PERP. PLANE; COS CORRECTED)

1st; VERT. ANG. 70°; GRV. OUTWD & PAR. TO LAMP
2nd; VERT. ANG. 100°; GRV. OUTWD & PERP. TO LAMP

ANGULAR EMITTING CHARACTERISTICS
(IN LAMP-PAR. PLANE; COS CORRECTED)

1st; VERT. ANG. 70°; GRV. OUTWD & PAR. TO LAMP
2nd; VERT. ANG. 100°; GRV. OUTWD & PERP. TO LAMP

ANGULAR EMITTING CHARACTERISTICS
(IN LAMP-PERP. PLANE; COS CORRECTED)

1st; VERT. ANG. 90°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PAR. PLANE; COS CORRECTED)

1st; VERT. ANG. 90°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PERP. PLANE; COS CORRECTED)

1st; VERT. ANG. 90°; GRV. OUTWD & PERP. TO LAMP
2nd; VERT. ANG. 90°; GRV. OUTWD & PAR. TO LAMP

ANGULAR EMITTING CHARACTERISTICS
(IN LAMP-PAR. PLANE; COS CORRECTED)

1st; VERT. ANG. 90°; GRV. OUTWD & PERP. TO LAMP
2nd; VERT. ANG. 90°; GRV. OUTWD & PAR. TO LAMP

ANGULAR EMITTING CHARACTERISTICS
(IN LAMP-PERP. PLANE; COS CORRECTED)

1st; VERT. ANG. 90° ; GRV. OUTWD & PERP. TO LAMP
2nd; VERT. ANG. 100° ; GRV. OUTWD & PAR. TO LAMP

ANGULAR EMITTING CHARACTERISTICS
(IN LAMP-PAR. PLANE; COS CORRECTED)

1st; VERT. ANG. 90° ; GRV. OUTWD & PERP. TO LAMP
2nd; VERT. ANG. 100° ; GRV. OUTWD & PAR. TO LAMP

ANGULAR EMITTING CHARACTERISTICS
(IN LAMP-PERP. PLANE; COS CORRECTED)

1st; VERT. ANG. 90°; GRV. OUTWD & PAR. TO LAMP
2nd; VERT. ANG. 100°; GRV. OUTWD & PERP. TO LAMP

ANGULAR EMITTING CHARACTERISTICS
(IN LAMP-PAR. PLANE; COS CORRECTED)

1st; VERT. ANG. 90°; GRV. OUTWD & PAR. TO LAMP
2nd; VERT. ANG. 100°; GRV. OUTWD & PERP. TO LAMP

ANGULAR EMITTING CHARACTERISTICS
(IN LAMP-PERP. PLANE; COS CORRECTED)

1st; VERT. ANG. 100° ; GRV. OUTWD & PERP. TO LAMP
2nd; VERT. ANG. 90° ; GRV. OUTWD & PAR. TO LAMP

ANGULAR EMITTING CHARACTERISTICS
(IN LAMP-PAR. PLANE; COS CORRECTED)

1st; VERT. ANG. 100° ; GRV. OUTWD & PERP. TO LAMP
2nd; VERT. ANG. 90° ; GRV. OUTWD & PAR. TO LAMP

ANGULAR EMITTING CHARACTERISTICS
(IN LAMP-PERP. PLANE; COS CORRECTED)

1st; VERT. ANG. 100°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PAR. PLANE; COS CORRECTED)

1st; VERT. ANG. 100°; GRV. OUTWD & PAR. TO LAMP
2nd; VERT. ANG. 90°; GRV. OUTWD & PERP. TO LAMP

ANGULAR EMITTING CHARACTERISTICS
(IN LAMP-PERP. PLANE; COS CORRECTED)

SURFACE LIGHT SOURCE DEVICE AND LIQUID CRYSTAL DISPLAY

BACKGROUND OF THE INVENTION

1. Field of Invention

The present invention relates to techniques for narrowing the visual field or increasing the brightness of a surface light source device, by making use of two prism sheets. The present invention is especially advantageously applied to backlighting of a liquid crystal display which is observed preferentially from a certain direction.

2. Related Art

A well-known optical device taking the form of a sheet and acting to modify the propagation direction characteristic of a primary light beam supplied from one surface and to cause the beam to exit from the other surface as a secondary light beam is generally known as a prism sheet.

Generally, a prism sheet consists of a member in the form of a plate made of an optical material having a surface (or prism face) provided with a number of aligned, repeating V-shaped channels (an array of convex and convex portions). Since this device has a function of modifying directions of light flux having a cross-sectional area corresponding to the plasm face, the device is employed, for example, to adjust the illumination direction light for the backlighting of a liquid crystal display.

FIG. 1 is a perspective view diagrammatically showing a surface light source device using a prism sheet for this purpose. Referring to FIG. 1, a light guide plate 1 of wedge-shaped cross section is made of a light scattering guide. For example, the light scattering guide is fabricated by preparing a matrix of polymethylmethacrylate (PMMA) and uniformly dispersing a substance of a different index of refraction in the matrix.

The thick end surface of the wedge-shaped light guide plate 1 forms an incident surface 2. A light source device (fluorescent lamp) L is disposed near the incident surface 2. A reflector 3 consisting either of silver foil of positive reflectivity or of a white sheet of diffuse reflectivity is disposed along one surface (rear surface 6) of the light guide plate 1. The other surface 5 of the light guide plate 1 forms an exiting surface 5 for taking out light flux supplied from the light source L.

A prism sheet 4 is disposed outside this exiting surface 5. One surface of the prism sheet 4 has a V-shaped prism face 4a, 4b. The other surface is a flat surface 4e. If a well-known liquid crystal panel (liquid crystal display device) is disposed further outside the prism sheet 4, a liquid crystal display is given.

In this surface light source device, as the thickness of the light guide plate 1 falls off with distance from the incident surface 2, the surface light source device shows excellent efficiency of utilization of light and excellent brightness uniformity because of oblique surface multiple reflection effect occurring inside the light guide plate 1. This effect based on the shape of the light scattering guide is described in detail in Japanese Patent Laid-Open No. 198956/1995.

Light introduced into the light guide plate 1 from the light source device L is directed toward the thin-walled end surface 7 while being scattered and reflected inside the light guide plate 1. During this process, the light gradually exits from the exiting surface 5. As described later, if the diameters (generally, the correlation distance regarding structures of nonuniform indices of refraction) of particles having a different index of refraction and dispersed in the light guide plate 1 are not very small, light exiting from the exiting surface 5 has a clear direction of preferential propagation. In other words, a collimated light beam is taken out from the exiting surface 5. This nature is hereinafter referred to as the "emitting directivity" or "emission of directional light".

As discussed in detail later, this direction of preferential propagation (the direction of the main axis of the collimated light beam) is usually upwardly spaced about 25–30° from the exiting surface as viewed from the incident surface 2. Taking account of this, the prior art function of modifying the direction of propagation of the prism sheet 4 is described by referring to FIGS. 2 and 3.

FIG. 2 is a diagram associated with the arrangement of FIG. 1, illustrating the behavior of light the cross section taken along a direction vertical to the lamp L. "Direction vertical to the lamp L" means "direction vertical to the long axis of the lamp L", i.e., direction vertical to the direction to which the incident surface 2 extends". This may hereinafter be simply referred to as "lamp-vertical direction". Similarly, "direction parallel to the direction of the long axis of the lamp L", i.e., direction parallel to the direction to which the incident surface 2 extends, may be simply referred to as the "lamp-parallel direction".

The prism sheet 4 shown in FIG. 2 faces the exiting surface 5 of the light guide plate 1 with its prism face directed inward. Preferably, the prismatic vertical angle $\phi 3$ made in the prism face is about 60°. Prism sheets satisfying this condition and having a prismatic vertical angle $\phi 3$ of 64° are often used.

The refractive indices of materials of the matrix of the light guide plate 1 are generally about 1.4 to 1.6. Where this is taken into consideration, if light is directed to the light guide plate 1 from the direction indicated by the arrow L', the direction of preferential propagation of light flux exiting from the incident surface 5 forms an angle $\phi 2$=about 60° with respect to a normal to the exiting surface 5. Where a PMMA matrix having an index of refraction of 1.492 is used, the incident angle to the exiting surface 5 to give 100 2=about 60° is $\phi 1$=about 35° according to the Snell's law. A light beam corresponding to this direction of preferential propagation will hereinafter be referred to as a representative light beam, which is indicated by B1 herein.

The representative light beam B1 exiting from the exiting surface 5 travels straight through an air layer AR which can be regarded as having an index of refraction $n_0$=1.0. Then, the light enters the prism face 4a of the prism sheet 4 at an angle ($\phi 3$=about 60°) close to a right angle. This light beam enters the opposite prism face 4b at a smaller percentage.

Then, the representative light beam B1 travels substantially straight through the prism sheet 4 up to the opposite prism face 4b and is reflected regularly. The light beam then enters the flat surface 4e of the prism sheet 4 at an angle close to a right angle and then goes out of the prism sheet 4. By this process, the direction of preferential propagation of the light beam exiting from the exiting surface 5 is changed to a direction substantially vertical to the exiting surface 5. The whole light rays are collected into a light beam traveling substantially in the perpendicular direction. As a result, the angular range in which the emitting surface is observed to be luminous is restricted. This action is herein referred to as narrowing of the visual field. The visual field will be quantitatively defined later.

The modified direction of preferential propagation is not always vertical to the exiting surface 5. Rather, the direction can be adjusted in a considerable range of angles by selection of the vertical angle $\phi 3$ of the prism sheet 4, selection of the material (index of refraction) of the prism sheet 4, selection of the material (index of refraction) of the light guide plate 1, and so forth.

If the prism sheet 4 is so positioned that its prism face is directed outward, the preferential propagation direction is modified by similar prismatic action. In this case, however, the range of preferred prismatic vertical angles is wider than the range obtained where the prism face is directed inward. FIG. 3, which takes the same form as FIG. 2, illustrates this. The vertical angle $\phi 4$ of the prism made at the prism face is approximately 70°.

It is assumed that the direction of incident light lies in the direction indicated by the arrow L'. In the same way as in the case of FIG. 2, a representative light beam B2 corresponding to the preferential propagation direction enters the exiting surface 5 at an angle $\phi 4$=about 35°. Most of the incident light exits and enters the air layer AR whose index of refraction $n_0$=1.0. At this time, the exit angle $\phi 2$ is approximately 60°.

The representative light beam B2 travels straight through the air layer AR and then enters the flat surface 4e of the prism sheet 4 obliquely. The light follows the illustrated refracted path. Finally, the light goes out of the surface 4c of the prism sheet 4 at an angle almost normal to the exiting surface 5. The proportion of the light exiting from the surface 4d is smaller.

Since the path of the light after entering the flat surface 4e of the prism sheet 4 is varied by the index of refraction $n_2$ of the prism sheet 4 and by the prismatic vertical angle $\phi 4$, the preferential propagation direction can be adjusted by selecting these parameters. Because the whole light rays are collected substantially into the vertical direction, the visual field is narrowed in the same way as in the case of FIG. 2.

The action of modification of the propagation direction and the action of the narrowing of the visual field of the prism sheet disposed alone function effectively mainly in the plane vertical to the lamp. It is known that the propagation direction is modified less effectively in a plane parallel to the lamp L.

FIGS. 6 and 7 are graphs of data obtained by actual measurements, demonstrating the above-described phenomenon. The conditions under which the actual measurements were made are shown in FIGS. 4 and 5. The fundamental portions are commonly applied to various measurements for examples described later.

Referring first to FIG. 4, the same arrangement as that shown in FIG. 1 is shown. A light guide plate 1 of wedge-shaped cross section comprises a matrix of polymethyl-methacrylate (PMMA) having an index of refraction of 1.492 in which 0.08 wt % silicone resin material is uniformly dispersed as a material having a different index of refraction. The particle diameter of the silicone resin material is 2.0 $\mu$m. The index of refraction of the resin material is 1.4345. The dimensions are given in the figure.

The end surface which is thicker than the thin-walled end portion 7 of the light guide plate 1 forms the incident surface 2. A fluorescent lamp L having a diameter of 3 mm and taking the form of a long tube is spaced 1.0 mm from the incident surface. A reflective sheet R consisting of silver foil is mounted behind the fluorescent lamp L to prevent scattering of the light. A reflector 3 disposed along the rear surface 6 of the light guide plate 1 is made of a silver foil. A quite thin air layer having a thickness given by $\delta 1$ exists between the rear surface 6 and the reflector 3.

At the above-described particle diameter of the particles having the different index of refraction, the light guide plate 1 causes directional light to exit from it. A collimated light beam having a preferential propagation direction indicated by 5e exits from the incident surface 5. Measurements were made under the following conditions. Only the first prism sheet PS1 was located outside the exiting surface 5. Alternatively, the first and second prism sheets PS1 and PS2, respectively, were made to overlap each other with the thin air layer AR of the thickness $\delta 2$ therebetween. Indicated by LP is a liquid crystal display panel positioned when a liquid crystal display is to be constructed. The liquid crystal display panel LP was not positioned during measurements.

Only one prism sheet was positioned for the measurements giving the results shown in FIGS. 6 and 7. The arrangement of each prism sheet used for each measurement will be separately described.

A luminance meter is represented by M (LS110 manufactured by Minolta Co., Ltd.; visual angle of ⅓° closeup lens mounted). The center point P on the outer surface (bright surface) a of the prism sheet PS1 or PS2 was constantly viewed at a distance of 203 mm. The direction of the line of sight b was changed around the central point P. Under these conditions, the luminance meter M was used. Let $\phi$ be the angle of the line of sight b in the cross section that is vertical to the fluorescent lamp L (general expression of angle $\phi 2$ used in FIG. 2).

FIG. 5 is a view in which the angle of the line of sight b at the point P on the luminance meter M is generalized to three dimensions. The definition of the angle $\phi$ is also illustrated. As shown, we now consider a plane c on which the line of sight b which views the central point P is located. The plane c is parallel to the lamp L. The angle that this plane c makes with respect to the normal d to the bright surface a is the above-described angle $\phi$.

Let a straight line e pass through the central point P on the plane c, the straight line e being vertical to a direction parallel to the lamp. Let $\theta$ be the angle made between the straight line e and the line of sight b. Let $\beta$ be the angle that the line of sight makes to the normal line f starting from the central point P. Let $\zeta$ be the angle that the projection h of the line of sight b onto the bright surface a makes to a direction vertical to the lamp. Since these various measurements were made under conditions in which the direction of line of sight b can be expressed by using only the angles $\phi$ and $\theta$, neither the angle $\beta$ nor the angle $\zeta$ is cited.

The nomenclatures of the arrangements and postures of the prism sheets PS1 and PS2 are defined as follows.

(1) When the prism surface provided with V-shaped channels is directed toward the light scattering guide as shown in FIGS. 1 and 2, the V-shaped channels are referred to as facing inward. On the other hand, when the prism face provided with the V-shaped channels faces away from the light scattering guide, the channels are referred to as facing outward.

(2) When the prism sheets are so arranged that the direction of alignment of the V-shaped channels in the prism face is parallel to the fluorescent lamp L (incident surface 2) as shown in FIGS. 1 and 2, the direction of alignment is referred to as being parallel to the lamp or simply as being lamp-parallel. On the other hand, when the prism sheets are so arranged that the direction of alignment of the V-shaped channels formed in the prism face is vertical to the fluorescent lamp L (incident surface 2), the direction of alignment is referred to as being vertical to the lamp or simply as being lamp-vertical.

It is also assumed that the vertical angles of the prism sheets PS1 and PS2 are given by $\psi$. This notation is a generalization of φ3 shown in FIG. 2 or φ4 shown in FIG. 3. Description of data obtained by actual measurements is hereinafter given clause by clause. In the following description, a word "visual angle" which may also be known as "viewing angle" is used as an index representing the range of angles at which the bright surface is observed to be luminous. The visual angle is defined in a plane parallel to the lamp and also in a plane vertical to the lamp. The value is given by such a notation that the half-value width of the graph obtained by each measurement is located in the center, or 0° (e.g., ±30°).

[Graphs of FIGS. 6 and 7]

(1) PS1: prismatic vertical angle ψ=64°; the channels face inward, and the direction of alignment is parallel to the lamp.

PS2: not used (2) FIG. 6; Measurements were made under the condition φ=0°. At this time, the angle θ was scanned in the range of from −80° to +80°. This scanned angle is plotted on the horizontal axis.

FIG. 7; Measurements were made under the condition θ=0°. At this time, the angle φ was scanned in the range of from −80° to +80°. This scanned angle was plotted on the horizontal axis.

(3) The luminance value is plotted on the vertical axis in units of 1000 nt, where nt=cd/m². The plotted luminance value has been subjected to cosine correction to remove the factor (proportional to the inverse of the cosine of the inclination angle) contained in the output from the luminance meter M when the line of sight b is inclined with respect to the bright surface a. In the case of FIG. 6, θ is the inclination angle. In the case of FIG. 7, φ is the inclination angle. With respect to all other graphs, values subjected to cos corrections are employed as plotted luminance values.

(4) Explanation; It can be seen from both graphs that the measured peaks lie in the direction θ=φ=0°, i.e., the front of the surface light source device. For both graphs, the whole shape assumes a hill-shaped profile which is substantially symmetrical with respect to the peak and has feet.

However, it can be seen from the spread of both graphs that the visual field in a plane vertical to the lamp is very narrow but the visual field in a plane parallel to the lamp is considerably broad. For detailed values obtained from actual measurements, refer to Table 3 given later. In particular, in the present example using one prism sheet, narrowing of the visual field is accomplished in the plane vertical to the lamp but was not in the plane parallel to the lamp.

Although the data obtained from actual measurements is omitted for the arrangement where the prism face of the prism sheet 4 faces outward, narrowing of the visual field is also accomplished in the plane vertical to the lamp but not in the plane parallel to the lamp.

Many liquid crystal displays are observed preferentially from the front direction with respect to both vertical and horizontal directions. Back lighting applied to these liquid crystal displays is, of course, required to accomplish narrowing of the visual field in both vertical and horizontal directions, i.e., in the plane vertical to the lamp and also in the plane parallel to the lamp. Also, even if the preferentially observed direction is rather spread and conspicuous narrowing of the visual field is not required, the visual field is preferably restricted to some extent in the plane vertical to the lamp and in the plane parallel to the lamp, for the following reason.

If illuminating light propagates in the direction to which observation is hardly expected, i.e., in a direction in a greatly deviating from the front direction, e.g., in a direction spaced more than 30° from the front direction, then increase in the brightness of the surface light source device is hindered. This deteriorates the display quality of a liquid crystal display incorporating the light source device.

However, in the above-described well-known usage of prism sheets, it is impossible to satisfy the requirement, i.e., narrowing of the visual field both in the plane vertical to the lamp and in the plane parallel to the lamp.

Furthermore, even if intensive narrowing of the visual field is not required, it is difficult for the prior art techniques to accomplish considerable narrowing of the visual field in the plane vertical to the lamp and in the plane parallel to the lamp, thereby increasing the brightness of the surface light source device. The former (intensive narrowing of the visual field) is hereinafter referred to as "narrowing of the visual field". The latter (increase of the brightness caused by a considerable narrowing of the visual field) is hereinafter referred to as "increase of the brightness".

OBJECT AND SUMMARY OF THE INVENTION

Accordingly, it is an object of the present invention to accomplish narrowing of visual field of a surface light source device or increase of the brightness by using two prism sheets under certain conditions. This, in turn, permits improvement of display quality of the liquid crystal display having a preferential observational direction.

The present invention solves the foregoing problem by arranging first and second prism sheets along the exiting surface of a primary surface light source means in a given relation, the prism sheets satisfying given prismatic vertical angle conditions.

The second prism sheet is disposed outside of the first prism sheet and one of them is oriented substantially parallel to an incidence surface of a scattering guide plate employed in the primary light source means. The scattering guide plate has uniform scattering power inside and emits a directional light flux from the emitting surface.

Each prism face of the two prism sheets faces away from the primary surface light source means. The prismatic vertical angle of each prism sheet lies in the range of from about 70° to about 110°. The vertical angle is so selected that when light exiting from the existing surface of the primary surface light source means passes through the two prismatic sheets, the visual field is narrowed in two dimensions.

According to a preferred embodiment, prismatic vertical angles are 90° for the first prism and 70°, for the second prism.

If this surface light source means is disposed as a backlighting means behind a liquid crystal display panel, a liquid crystal display making effective use of narrowing of the visual field and increased brightness characteristics can be provided.

The present invention is based on the following principle:

If two prism sheets are piled on the exiting surface of the surface light source device in such a way that the directions of alignment of the channels in the two sheets are vertical to each other, the surface light source device shows narrowing of the visual field or increase of the brightness under certain vertical angle conditions.

In the surface light source device on which the two prism sheets are disposed, the light intensity profile in the cross section of the exiting light flux is preferably flat from a practical point of view. In order to make better use of the functions of the narrowing of the visual field or increase of the brightness, it is desirable that the light emitted from the device have directivity.

The light scattering guide provides a light guide plate which is advantageously used in the surface light source device of the present invention. The scattering characteristics of the light scattering guide, especially the directivity of the emitted light, or collimation of the light, are described by quoting the Debye theory.

When light having intensity $I_0$ travels y(cm) through a medium (light scattering guide) and the intensity is attenuated to I by the resulting scattering, the effective scattering irradiation parameter E is defined by the following Eq. (1) or (2).

$$E[\text{cm}^{-1}]=-[\ln(I/I_0)]/y \quad (1)$$

$$E[\text{cm}^{-1}]=-(1/I)\cdot dI/dy \quad (2)$$

The above equations (1) and (2) are so-called integral form and differential form, respectively. They are equivalent in physical meaning. The effective scattering irradiation parameter E may also be called turbidity.

Where scattering of light occurs due to nonuniform structures distributed in a medium, the intensity of the scattering light under normal condition where incident light is vertically polarized light and most of exiting light is vertically polarized (Vv scattering) is given by $$Vv=[(4<\eta^2>\pi^3)/\lambda_0^4]\int_0^\infty C\gamma(r)dr \quad (3)$$

where $$C=[r^2 \sin(\nu sr)]/\nu sr \quad (4)$$

As well known, natural light is provided, the following equation obtained by multiplying the right hand of Eq. (3) by $(1+\cos^2 \Phi)2$ is regarded as scattered light intensity, taking account of Hh scattering.

$$Ivh=Vv(1+\cos^2 \Phi)/2 \quad (5)$$

where $\lambda_0$ is the wavelength of incident light, $\nu=(2\pi n)/\lambda_0$, and $s=2 \sin(\Phi/2)$. Indicated by n is the index of refraction of the medium. $\Phi$ is the scattering angle. $<\eta^2>$ is the squares mean of fluctuations of the dielectric constant in the medium. In the following description, $\tau$ may be used, assuming that $<\eta^2>=\tau$. $\gamma(r)$ is known as a correlation function. This correlation function $\gamma(r)$ is given by $$\gamma(r)=\exp(-r/a) \quad (6)$$

According to the Debye theory, if refractive index nonuniform structures of a medium are dispersed and divided into phase A and phase B with an interface, then the following relational formulas (7) and (8) hold regarding the correlation function $\gamma(r)$, the correlation distance a, and the squares mean of fluctuations of the dielectric constant $\tau$.

$$a[\text{cm}]=(4V/S)\cdot\phi A\phi B \quad (7)$$

$$\tau=\phi A\phi B(nA^2-nB^2)^2 \quad (8)$$

If the nonuniform structures of the refractive index can be regarded as consisting of a spherical interface of radius R, then the correlation distance a is given by $$a[\text{cm}]=(4/3)R(1-\phi A) \quad (9)$$

Eq. (6) concerning the function $\gamma(r)$ is used. Natural light is provided, effective scattering irradiation parameter E is calculated, based on Eq. (5) and the formula (6) for correlation function. The result is given below.

$$E=[(32a^3\tau\pi^4)/\lambda_0^4]f(b) \quad (10)$$

where $$f(b)=[\{(b+2)^2/b^2(b+1)\}-\{2(b+2)/b^3\cdot\ln(b+1)] \quad (11)$$

$$b=4\nu^2a^2 \quad (12)$$

It can be seen from the relations described thus far that the correlation distance a, the squares mean of fluctuations of the dielectric constant $\tau$, and the effective scattering irradiation parameter E are mutually dependent on each other.

In FIG. 8, the correlation distance a is plotted on the horizontal axis, while the squares mean of fluctuations of the dielectric constant $\tau$ is plotted on the vertical axis. Curves expressing conditions under which the effective scattering irradiation parameter E is constant are drawn about E=50 cm$^{-1}$ and E=100 cm$^{-1}$.

Generally, light scattering guides having large values of E tend to have large scattering power. Light scattering guides having small values of E tend to have small scattering power. E=0 cm$^{-1}$ indicates a transparent state in which no scattering occurs at all. Therefore, the following general rule holds: a light scattering guide having a small value of E is suitable for a surface light source device having a wide luminous portion; Conversely, a light scattering guide having a large value of E is suitable for a surface light source device having a narrow luminous portion. Taking this rule into account, the range E=0.45 cm$^{-1}$ to 100 cm$^{-1}$ provides a rough standard of the effective scattering irradiation parameter E preferable for applications to backlighting of ordinary size.

On the other hand, the correlation distance a is deeply concerned with the direction characteristics of scattered light in individual scattering phenomena inside the light scattering guide. That is, as can be estimated from the forms of Eqs. (3)–(5), light scattering inside the light scattering guide generally has forward scattering nature. The magnitude of the forward scattering is varied by the correlation distance a.

FIG. 9 is a graph illustrating this regarding two values of a. In the figure, the horizontal axis indicates the scattering angle $\Phi$, it being noted that the direction of propagation of incident rays is given by $\Phi=0°$. The vertical axis indicates the intensity of scattered light when natural light is assumed. That is, it indicates the value obtained by normalizing Eq. (5) with respect to $\Phi=0°$, or Vvh($\Phi$)/Vvh(0).

As is drawn also in FIG. 9, a=0.13 $\mu$m corresponding to 2R=0.2 $\mu$m in particle size converted by Eq. (9) is provided, the graph of the normalized scattering intensity is a slowly decreasing function regarding $\Phi$. On the other hand, a=1.3 $\mu$m corresponding to 2R=2.0 $\mu$m in particle size converted by Eq. (9) is provided, the graph of the normalized scattering intensity shows a rapid falling in a range of small $\Phi$.

In this way, scattering caused by minute refractive index nonuniform structures inside a light scattering guide essentially has forward scattering nature. As the correlation distance a decreases, the intensity of the forward scattering nature weakens, and the range of angles of scattering for one scattering process tends to widen. Conversely, as the correlation distance a increases, the forward scattering property tends to become stronger.

The discussion thus far has been held on individual scattering phenomena themselves due to refractive index nonuniform structures distributed in the light scattering guide. In order to evaluate the direction characteristics of light actually exiting from the exiting surface of the light scattering guide, it is necessary to take account of both total reflection phenomenon at the exiting surface and transmittivity (the rate at which light escapes from the light scattering guide) when light exits from the surface.

As already described by referring to FIG. 2, if the incident angle (assuming that the direction of a normal to the exiting surface lies at 0°) from inside the light scattering guide onto the exiting surface is greater than the critical angle αc determined by the indices of refraction of media inside and outside the light scattering guide, no light exit (escape) to the outside (air layer).

For PMMA (having an index of refraction of 1.492) which is a representative material capable of being used in the matrix of the novel light scattering guide, αc=42°. Other materials give similar values. Representative materials of the matrix of the light scattering guide are listed in Tables 1 and 2.

TABLE 1

| Category | Name of Polymer | Refractive Index |
|---|---|---|
| MA | 1. PMMA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polyycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-n-butyl acrylate] | 1.4535 |
| XA | 18. PBzMA [polybenzyl acrylate] | 1.5584 |
| | 19. Poly(2-ClEA) [poly-2-chloroethyl acrylate] | 1.52 |

TABLE 2

| Category | Name of Polymer | Refractive Index |
|---|---|---|
| AC | 20. PVAc [polyvinyl acetate] | 1.47 |
| XA | 21. PVB [polyvinyl benzoate] | 1.578 |
| | 22. PVAc [polyvinyl phenyl acetate] | 1.567 |
| | 23. PVClAc [polyvinyl chloroacetate] | 1.512 |
| N | 24. PAN [polyacrylonitrile] | 1.52 |
| | 25. Poly(αMAN) [poly-α-methyl acrylonitrile] | 1.52 |
| α-A | 26. PMA(2Cl) [polymethyl-α-chloroacrylate] | 1.5172 |
| St | 27. Poly(o-ClSt) [poly-o-chlorostyrene] | 1.6098 |
| | 28. Poly(p-FSt) [poly-p-fluorostyrene] | 1.566 |
| | 29. Poly(o, p-FSt) [poly-o-, p-diflurostyrene] | 1.475 |

TABLE 2-continued

| Category | Name of Polymer | Refractive Index |
|---|---|---|
| | 30. Poly(p-iPSt) [poly-p-isopropyl styrene] | 1.554 |
| | 31. PSt [polystyrene] | 1.59 |
| C | 32. PC [polycarbonate] | 1.59 |

Since scattering occurring inside a light scattering guide generally shows forward scattering nature as mentioned above, in the case in which the incident surface is located at a side of the exiting surface as in the arrangement of FIG. 1, primary scattered light produced travelling through the incident surface and meeting nonuniform structures hardly satisfies the above-described critical angle conditions.

In other words, most of light exiting from the exiting surface after satisfying the critical angle conditions is considered to have experienced multiple scattering inside the light scattering guide and reflections off reflectors disposed at or close to the interface behind the light scattering guide.

Accordingly, if attention is paid only to the light satisfying the critical angle conditions, the forward scattering nature which is an attribute of individual scattering phenomena will be weakened considerably and hence the distribution of the propagation direction of light will be considerably spread. As a result, the direction characteristics of light exiting from the light scattering guide are greatly depending on the angle dependence of the transmittivity (rate of escape) at the existing surface for the light satisfying the critical angle conditions.

It is known that the interface transmittivity is generally quite low where the critical angle conditions are narrowly satisfied. For example, in the case of an acrylic resin-air interface, the interface transmittivity for P-polarized light is about 40%, and the interface transmittivity for S-polarized light is about 20%. However, if the incident angle is lower than the critical angle by some amount, then the interface transmittivity increases rapidly. If the incident angle is less than the critical angle by 5 to 10° or more, the transmittivity is almost constant. For instance, in the case of an acrylic resin-air interface, the interface transmittivity is more than 90% for P-polarized light and more than 85% for S-polarized light.

According to an estimate based on the foregoing, the light entering at incident angles of about 35° to the exiting surface contributes most to light emission from the exiting surface of the light scattering guide. If the considerations given in connection with FIGS. 2 and 3 and refraction at the exiting surface are taken into consideration, the light entering the exiting surface at incident angles of about 35° makes exiting angles of about 60° to the normal to the exiting surface. It is to be noted that the index of refraction of the light scattering guide is in general around 1.5.

Eventually, roughly speaking, is light going out of the existing surface of the light scattering guide has directivity in a direction upwardly spaced about 30° from the exiting surface.

It is to be noted that if the correlation distance a becomes too small, the forward scattering nature itself weakens. As a result, even if only primary scattering is taken into account, scattering light is produced over a wide range of directions. This lowers the directivity of the outgoing light. Roughly estimated, correlation distance a greater than 0.01 μm hardly gives such a phenomenon conspicuously. A preferable range is a<0.05 μm. This is considered as the condition under which the light scattering guide has emitting directivity.

In the present invention, light flux going out of the light guide plate consisting of a light scattering guide which imparts directivity to the outgoing light is supplied to two prism sheets. As a consequence, a surface light source device accomplishing narrowing of the visual field or increased brightness is provided.

Generally, the manner in which prism sheets are disposed has the following degrees of freedom.

(1) It is possible to select either the inward arrangement of the channels or outward arrangement of the channels for each of the prism sheets PS1 and PS2 (see FIG. 4). The latter arrangement is necessary for the present invention.

(2) Orientations of the prism sheets PS1 and PS2. That is, it is possible to select either the lamp-parallel orientation or lamp-vertical orientation. In the present invention, where the prism sheet PS1 is placed parallel to the lamp, the prism sheet PS2 is placed vertical to the lamp.

Conversely, where the prism sheet PS1 is placed vertical to the lamp, the prism sheet PS2 is placed parallel to the lamp.

With respect to the prismatic vertical angle conditions, the vertical angles of both prism sheets are selected in the range from about 70° to 110°. However, as can be understood from the various examples given below, the degree of accomplishment of the narrowing of the visual field and increase of the brightness varies considerably depending on the combination of the prismatic vertical angle conditions of the prism sheets. Therefore, it is desired to flexibly select the specific prismatic vertical angle conditions, taking account of the characteristics required for the surface light source device or a liquid crystal display using a backlighting arrangement making use of the surface light source device, as well as data obtained from actual measurements, the data being given in the various examples.

The present invention is hereinafter described in further detail by referring to the accompanying drawings.

BRIEF DESCRIPTION OF THE DRAWINGS

FIG. 4A is a cross-sectional view of the various prism sheet surfaces that can be used with the surface light source device;

FIG. 9 is a graph illustrating the manner in which the forward scattering property of a light scattering guide changes with the correlation distance a;

Where a well-known liquid crystal display or liquid crystal display panel is disposed outside the prism sheet 4, a liquid crystal display construction is completed.

PREFERRED EMBODIMENTS OF THE INVENTION

To briefly describe the features of the embodied examples of the invention, the examples are classified into group I and group II. The graphs of FIGS. 10–31 are described clause by clause. Group I (Examples 1–7) mainly intends clear narrowing of the visual field. Increase of the brightness is also at least considerably accomplished as a result of the narrowing of the visual field.

Group II (examples 8–11) mainly intends to increase the brightness. Narrowing of the visual field is also accomplished at least to some extent.

Figure 1:
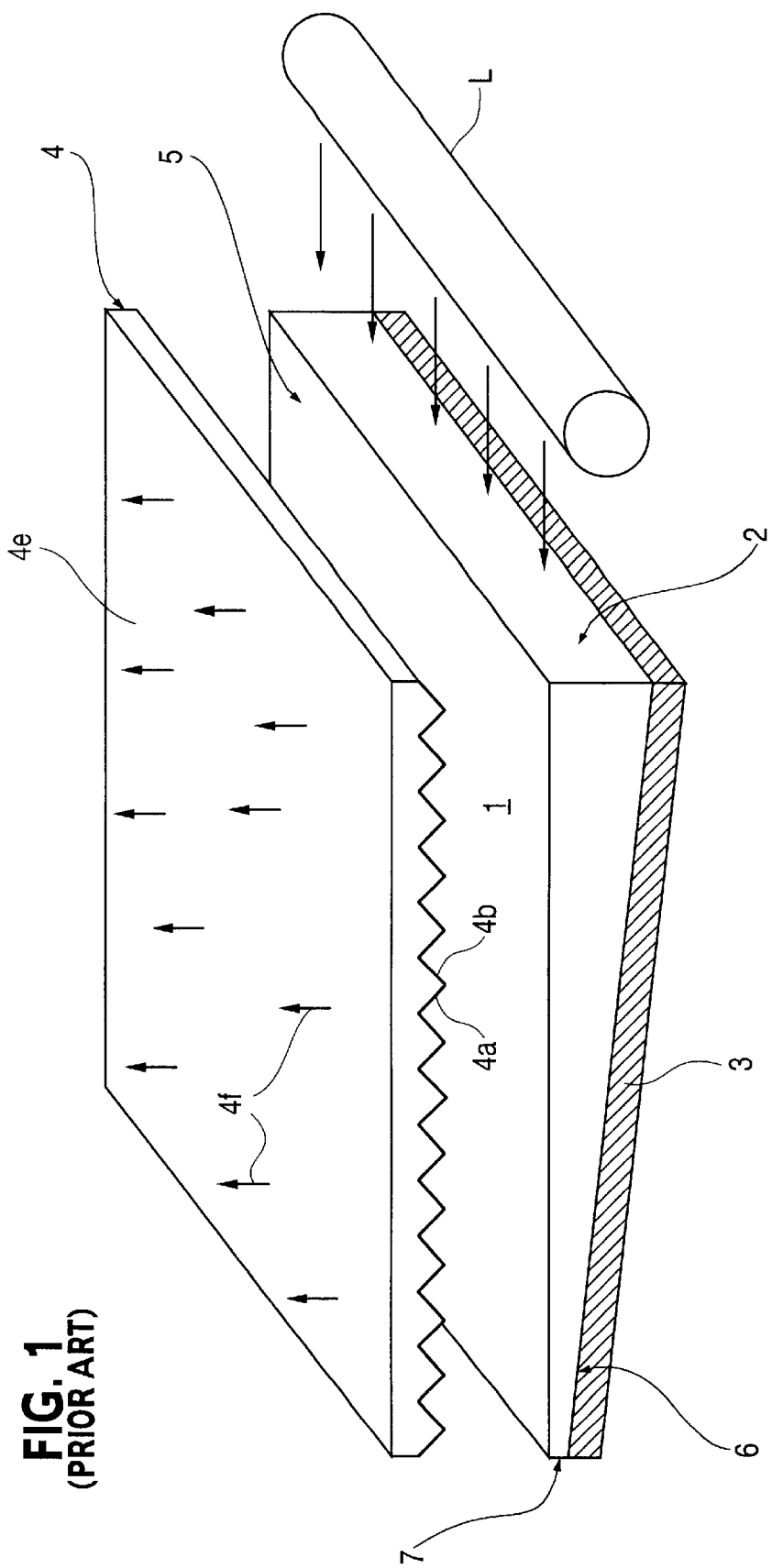
FIG. 1 is a perspective view of a conventional surface light source device using prism sheets.
Figure 2:
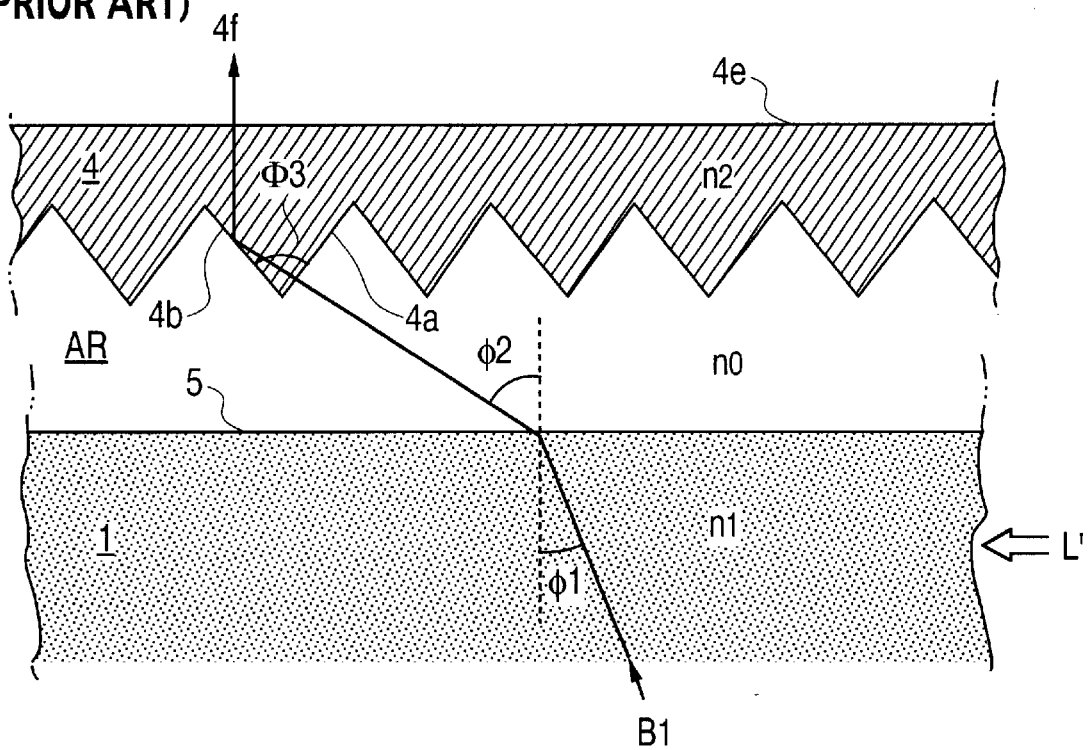
FIG. 2 is a diagram associated with the arrangement shown in FIG. 1, illustrating the behavior of light in a cross section taken along a direction vertical to a lamp L.
Figure 3:
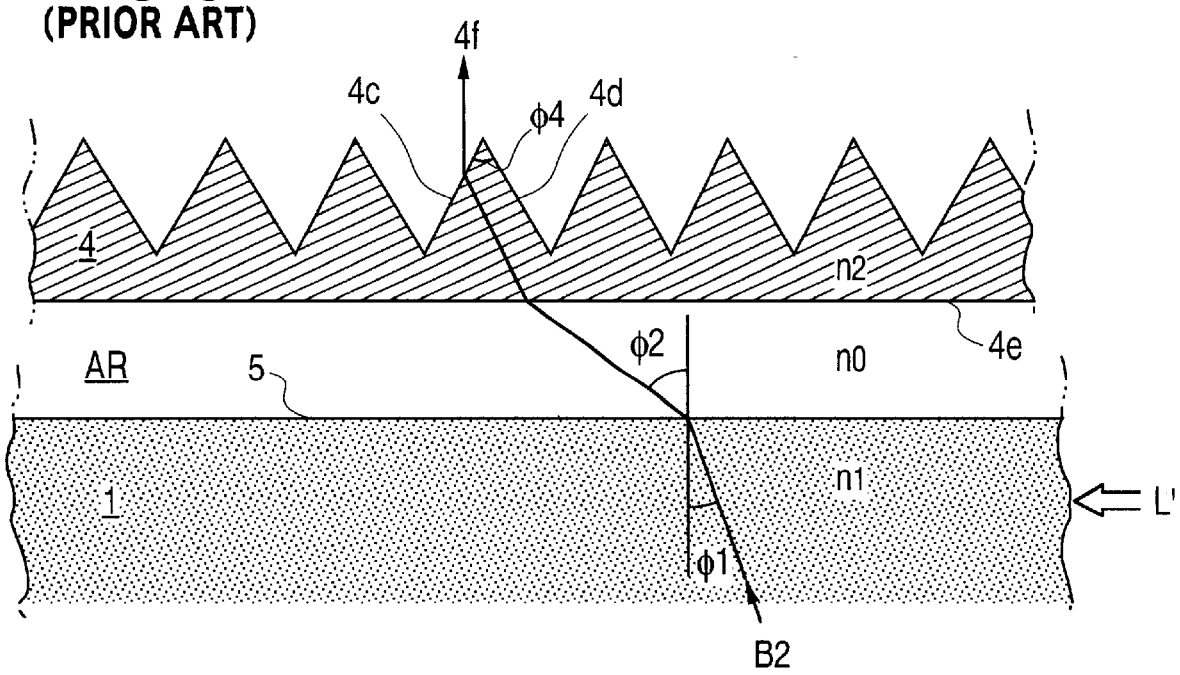
FIG. 3 is a diagram associated with the arrangement shown in FIGS. 1 and 2, in which a prism sheet 4 is inverted and its prism face is directed outward, for illustrating behavior of light.
Figure 4:
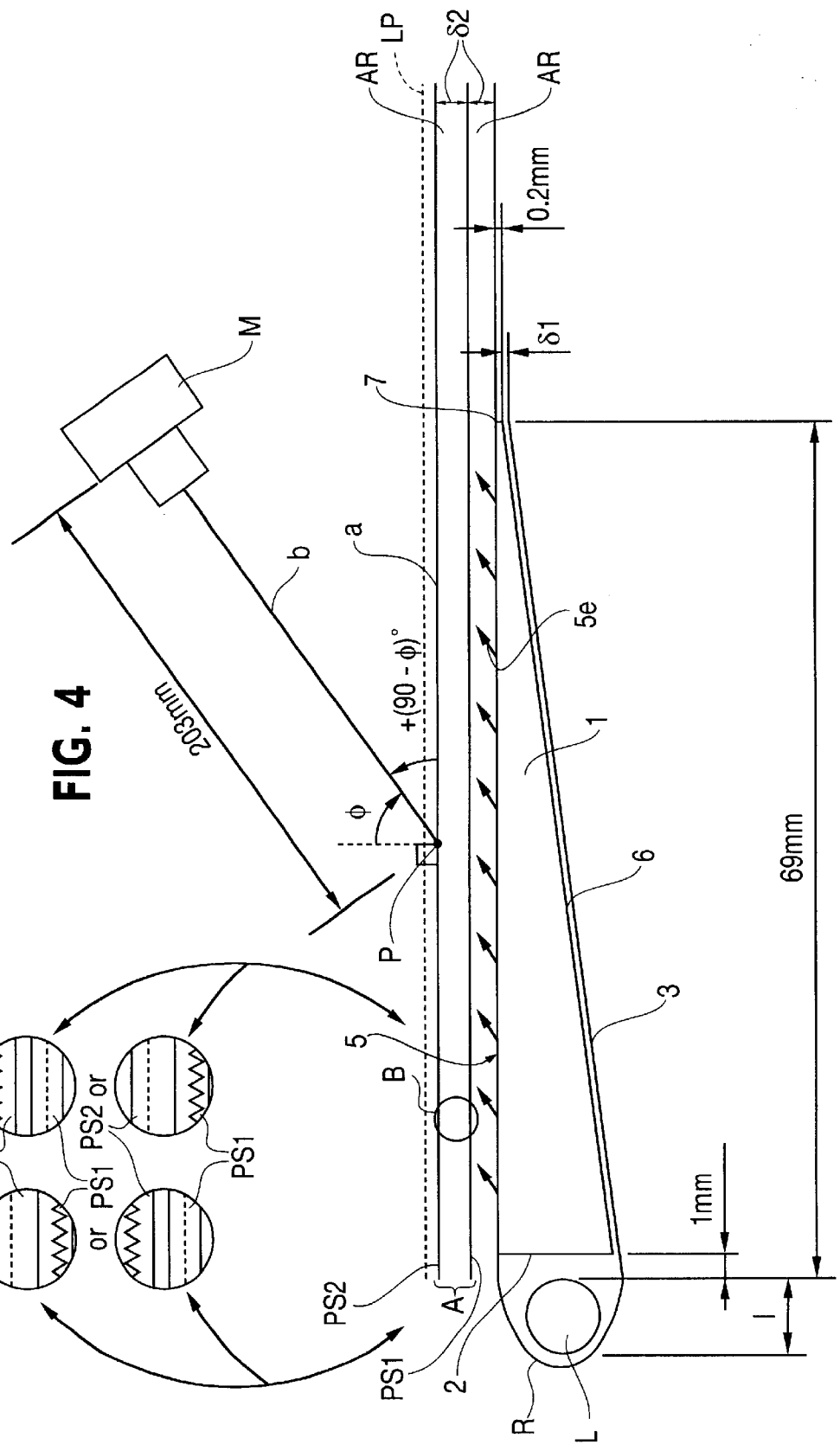
FIG. 4 is a cross-sectional view of the basic structure of a surface light source device according to each example of the invention, also showing the arrangement of the device adopted when measurements are made with a luminance meter for various examples of the invention and referential examples.
Figure 5:
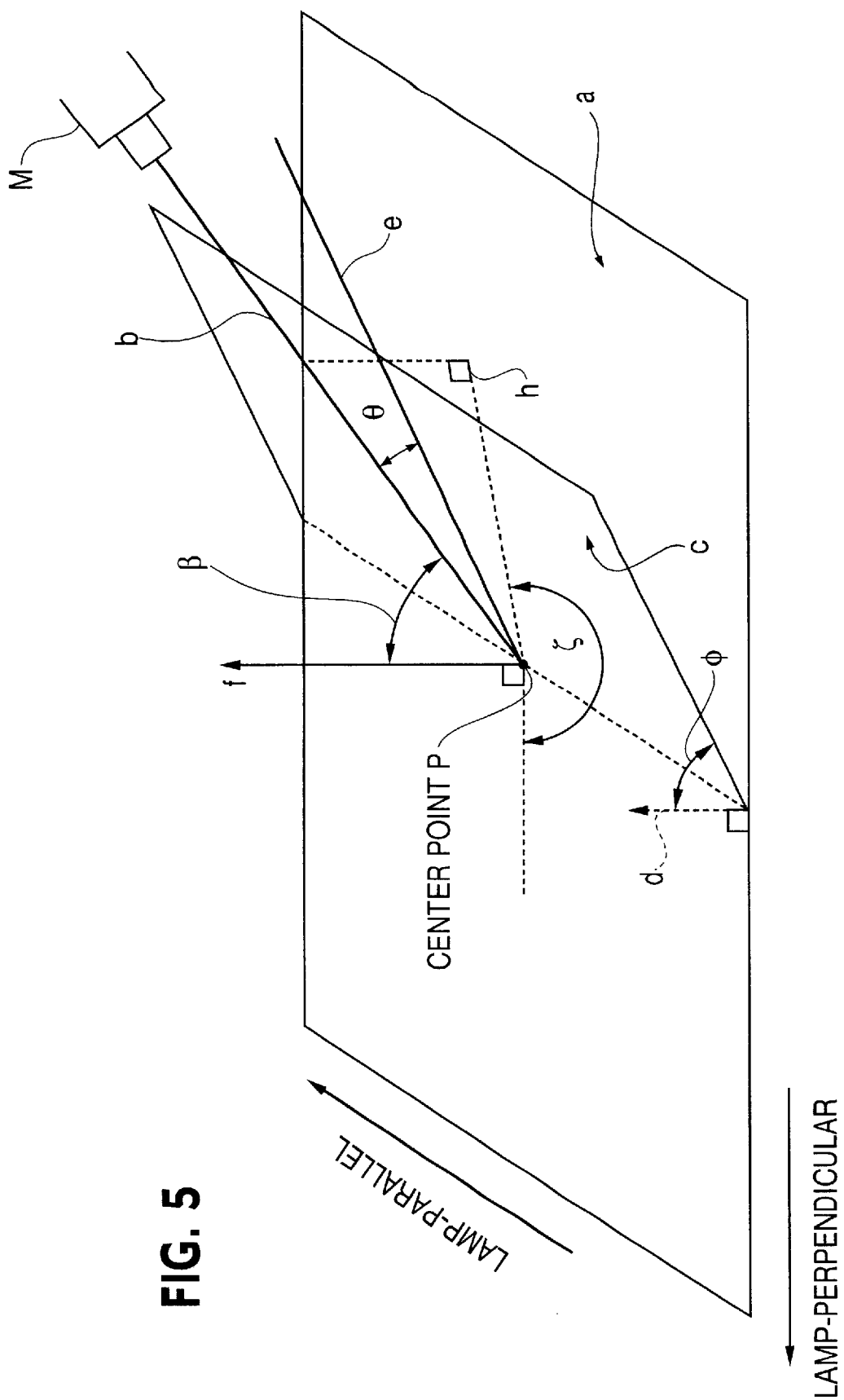
FIG. 5 is a view illustrating three-dimensional arrangement adopted when measurements are made with a luminance meter for various examples of the invention and referential examples.

The conditions of all the examples, including the measurement conditions and excluding the direction of arrangement of two prism sheets, orientations (either inward or outward) and vertical angle conditions, have been already described in connection with FIG. 4, which shows the essential structure of the surface light source device of each example. Obviously, where the surface light source device is applied to backlighting arrangement for a liquid crystal display, a liquid crystal display panel LP is disposed outside two prism sheets, although during measurements, no liquid crystal a display panel LP is disposed.

Prism faces of the first and second prism sheets PS1 and PS2, respectively, are shown in partial illustrating denoted by A and B in FIG. 4A. Partial illustration A shows an enlarged view from the side of the lamp L while partial illustration B shows an enlarged cross section. In entry embodiment, one of the prism sheets PS1, PS2 has a prism face formed by an array of v-shaped channels substantially parallel to the incidence surface 2 and the other has a prison face formed by an array of V-shaped channel substantially perpendicular to the incidence surface 2.

These matters common to these examples will not be repeatedly described below. The meanings of the vertical and horizontal axes of the graphs and the method of plotting brightness values (i.e., adoption of cosine corrected values) have been already described in connection with the graphs of FIGS. 6 and 7 for referential examples.

Figure 10:
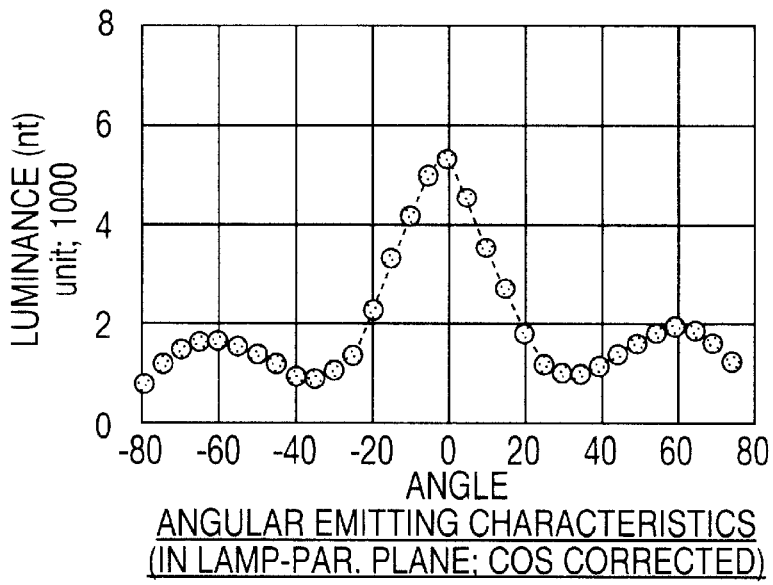
FIG. 10 is a graph showing the results of measurements of the emitting characteristics of Example 1 in a plane parallel to a lamp.
Figure 11:
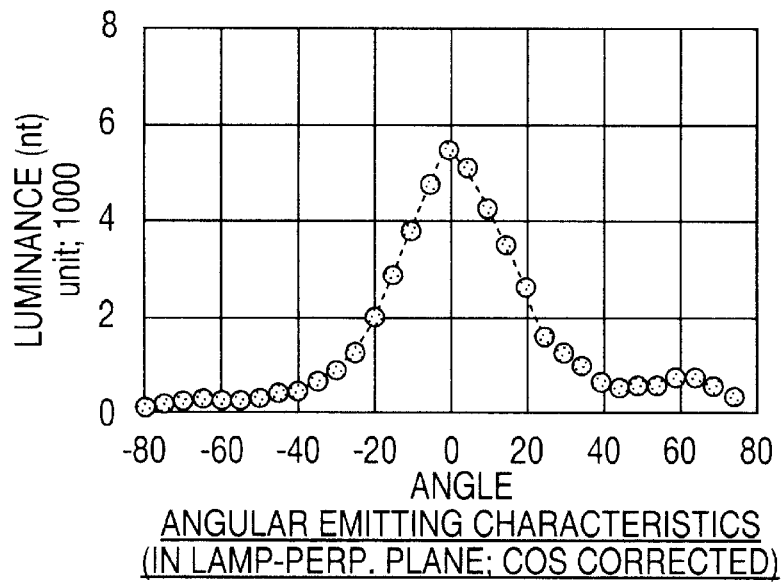
FIG. 11 is a graph showing the results of measurements of the emitting characteristics of Example 1 in a plane vertical to a lamp.

[Graphs of FIGS. 10 and 11; Example 1 (Group I)]
(1) PS1; prismatic vertical angle $\psi=90°$; the channels are directed outward and parallel to the lamp.
PS2; prismatic vertical angle $\psi=70°$; the channels are directed outward and vertical to the lamp.

(2) FIG. 10; At $\phi=0°$, $\theta$ is scanned from $-80°$ to $+80°$.
FIG. 11; At $\theta=0°$, $\phi$ is scanned from $-80°$ to $+80°$.

(3) Explanation; It can be seen from both graphs that peaks are observed in the direction $\theta=\phi=0°$, i.e., in front of the surface light source device. For each graph, the whole shape is roughly symmetrical about the peak and shows a hill-shaped profile having feet. However, small ridged portions exist around $\theta=\pm60°$ in a plane parallel to the lamp.

It can be seen from the spread of each graph that the visual field in the plane vertical to the lamp and the visual field in the plane vertical to the lamp are both very narrow. That is, in the present example, it is obvious that narrowing of the visual field has been accomplished both in the plane parallel to the lamp and in the plane vertical to the lamp. It cannot be said that the levels of the brightness of the peaks are especially high. However, these levels are higher than the levels of the referential examples shown in FIGS. 6 and 7 in each of which only one prism sheet is employed. Consequently, considerable increase of the brightness has been achieved.

Figure 12:
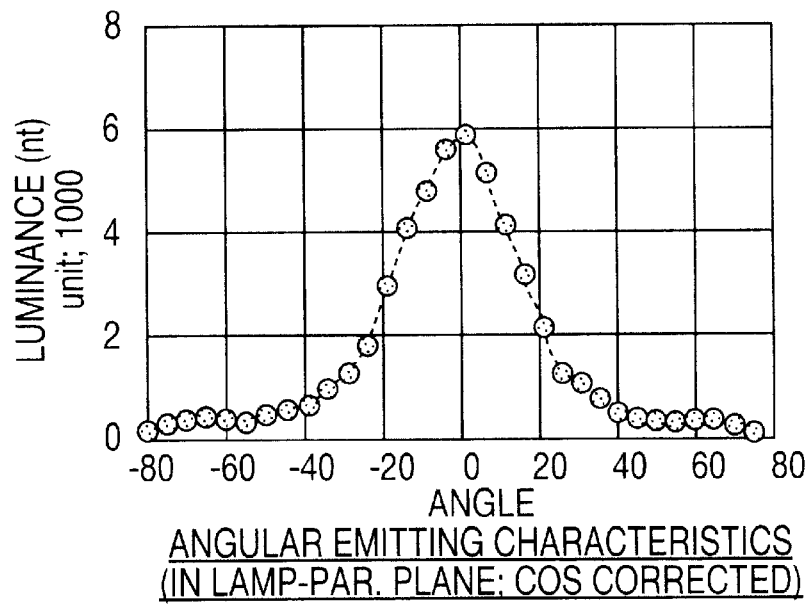
FIG. 12 is a graph showing the results of measurements of the emitting characteristics of Example 2 in a plane parallel to a lamp.
Figure 13:
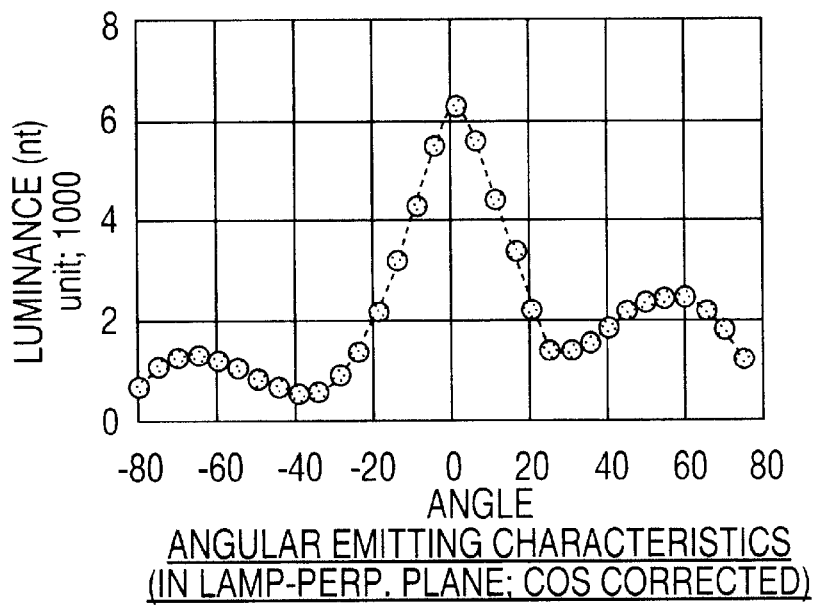
FIG. 13 is a graph showing the results of measurements of the emitting characteristics of Example 2 in a plane vertical to a lamp.

[Graphs of FIGS. 12 and 13; Example 2 (Group I)]
(1) PS1; prismatic vertical angle $\psi=90°$; the channels are directed outward and vertical to the lamp.
PS2; prismatic vertical angle $\psi=70°$; the channels are directed outward and parallel to the lamp.

(2) FIG. 12; At $\phi=0°$, $\theta$ is scanned from $-80°$ to $+80°$. FIG. 13; At $\theta=0°$, $\phi$ is scanned from $-80°$ to $+80°$.

(3) Explanation; It can be seen from both graphs that peaks are observed in the direction $\theta=\phi=0°$, i.e., in front of the surface light source device. For each graph, the whole shape is roughly symmetrical about the peak and shows a hill-shaped profile having feet. However, small ridged portions exist around $\phi=\pm60°$ in a plane vertical to the lamp.

It can be seen from the spread of each graph that the visual field in the plane vertical to the lamp and the visual field in the plane vertical to the lamp are both very narrow. That is, in the present example, it is obvious that narrowing of the visual field has been accomplished both in the plane parallel to the lamp and in the plane vertical to the lamp. The levels of the brightness of the peaks are higher than the level of Example 1. That is, it is obvious that increase of the brightness has been achieved.

Figure 14:
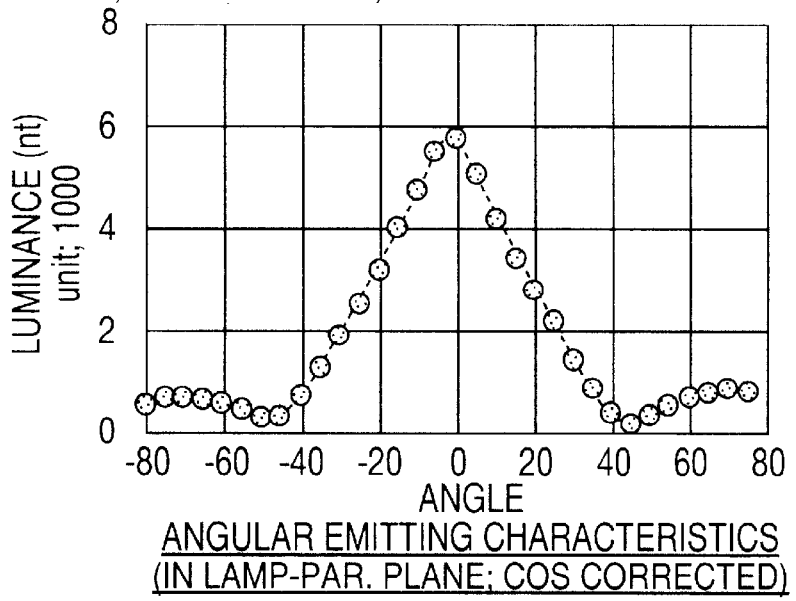
FIG. 14 is a graph showing the results of measurements of the emitting characteristics of Example 3 in a plane parallel to a lamp.
Figure 15:
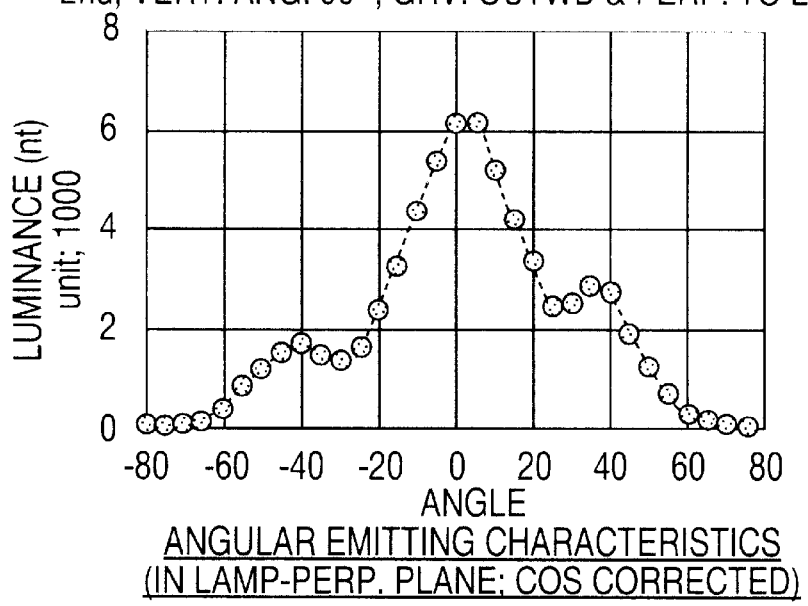
FIG. 15 is a graph showing the results of measurements of the emitting characteristics of Example 3 in a plane vertical to a lamp.

[Graphs of FIGS. 14 and 15; Example 3 (Group I)]
(1) PS1; prismatic vertical angle $\psi=70°$; the channels are directed outward and parallel to the lamp.
PS2; prismatic vertical angle $\psi=90°$; the channels are directed outward and vertical to the lamp.

(2) FIG. 14; At $\phi=0°$, $\theta$ is scanned from $-80°$ to $+80°$.
FIG. 15; At $\theta=0°$, $\phi$ is scanned from $-80°$ to $+80°$.

(3) Explanation; It can be seen from both graphs that peaks are observed in the direction $\theta=\phi=0°$, i.e., in front of the surface light source device. For each graph, the whole shape is roughly symmetrical about the peak and shows a hill-shaped profile having feet. However, small ridged portions exist around $\theta=\pm50°$ to $\pm80°$ in the plane parallel to the lamp. Also, small ridged portions are present around $\phi=\pm40°$.

It can be seen from the spread of each graph that the visual field in the plane vertical to the lamp is very narrow and that the visual field in the plane vertical to the lamp is less narrow. That is, in the present example, it is obvious that narrowing of the visual field has been accomplished in the plane parallel the lamp. Similarly, it is obvious that narrowing of the visual field in the plane vertical to the lamp has been accomplished. The levels of the brightness of the peaks are comparable to the level of Example 2. That is, it is obvious that increase of the brightness has been achieved.

Figure 16:
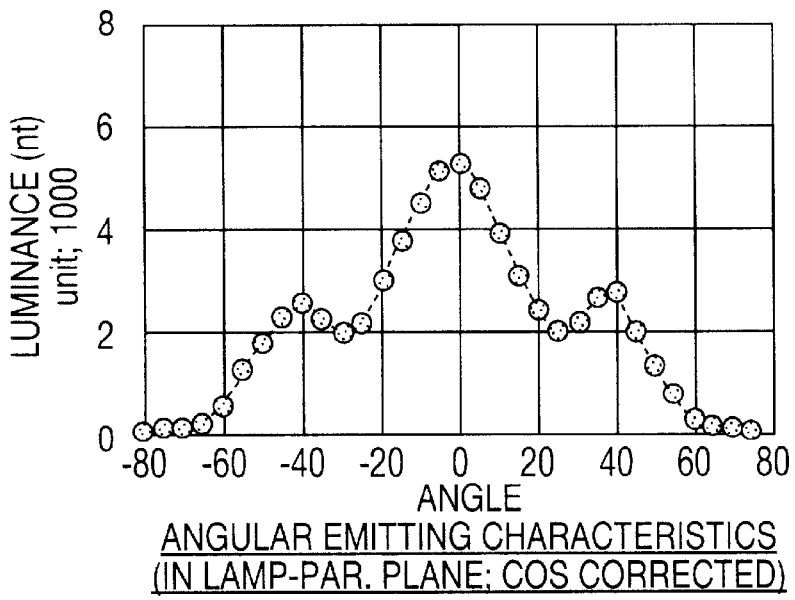
FIG. 16 is a graph showing the results of measurements of the emitting characteristics of Example 4 in a plane parallel to a lamp.
Figure 17:
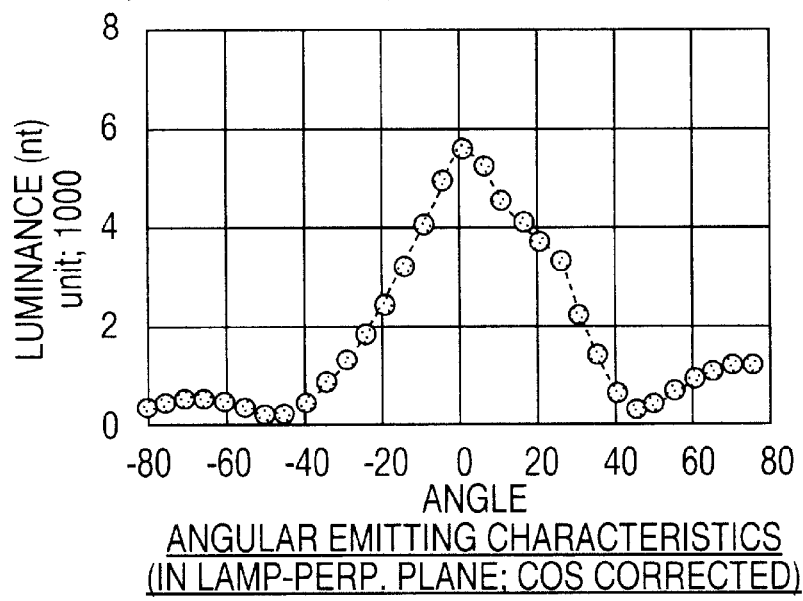
FIG. 17 is a graph showing the results of measurements of the emitting characteristics of Example 4 in a plane vertical to a lamp.

[Graphs of FIGS. 16 and 17; Example 4 (Group I)]
(1) PS1; prismatic vertical angle ψ=70°; the channels are directed outward and vertical to the lamp.
PS2; prismatic vertical angle ψ=90°; the channels are directed outward and parallel to the lamp.
(2) FIG. 16; At φ=0°, θ is scanned from −80° to +80°.
FIG. 17; At θ=0°, φ is scanned from −80° to +80°.
(3) Explanation; It can be seen from both graphs that peaks are observed in the direction θ=φ=0°, i.e., in front of the surface light source device. For each graph, the whole shape is roughly symmetrical about the peak and shows a hill-shaped profile having feet. However, small ridged portions exist around θ=±40° in the plane parallel to the lamp. Also, small ridged portions are present around φ=±50° to ±90°.

It can be seen from the spread of each graph that the visual field in the plane parallel to the lamp and the visual field in the plane vertical to the lamp are both considerably narrow. That is, in the present example, it is obvious narrowing of the visual field has been accomplished both in the plane parallel to the lamp and in the plane vertical to the lamp. The levels of brightness of the peaks are high, in the same way as in Example 1. Consequently, considerable increase of the brightness has been achieved.

Figure 18:
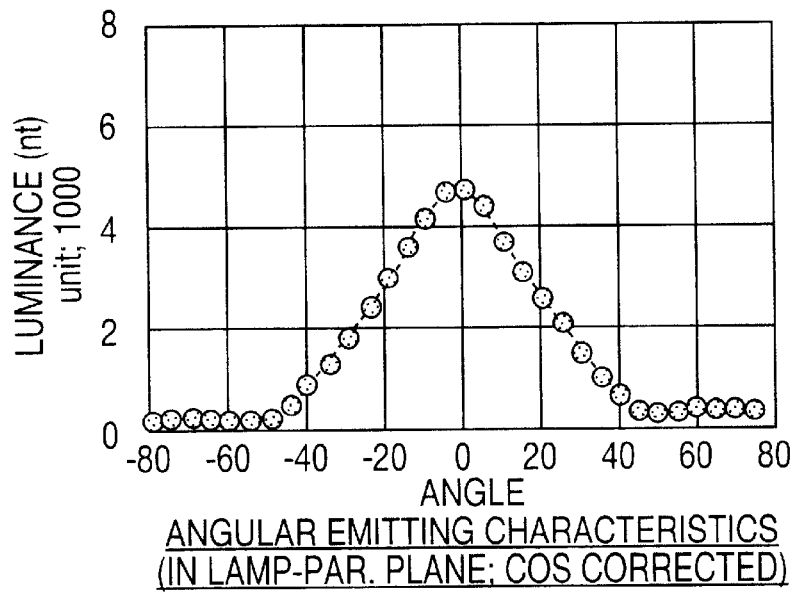
FIG. 18 is a graph showing the results of measurements of the emitting characteristics of Example 5 in a plane parallel to a lamp.
Figure 19:
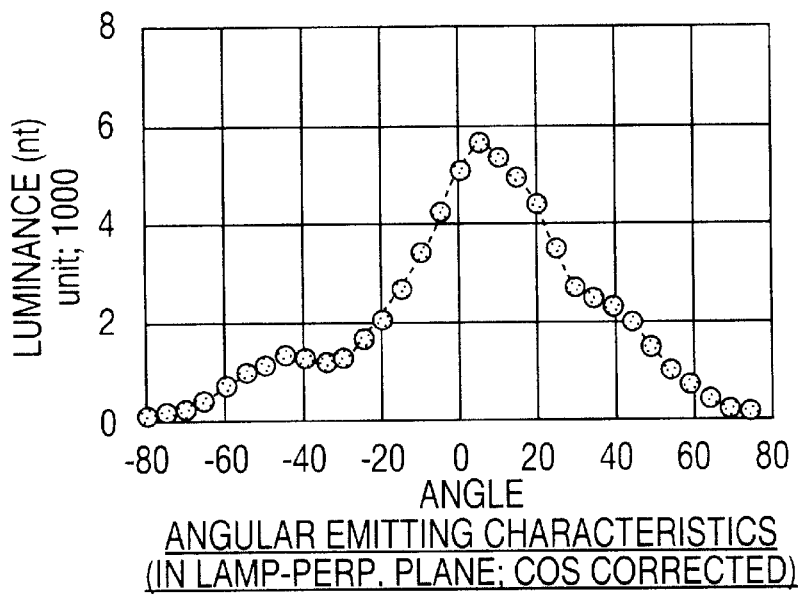
FIG. 19 is a graph showing the results of measurements of the emitting characteristics of Example 5 in a plane vertical to a lamp.

[Graphs of FIGS. 18 and 19; Example 5 (Group I)]
(1) PS1; prismatic vertical angle ψ=70°; the channels are directed outward and parallel to the lamp.
PS2; prismatic vertical angle ψ=100°; the channels are directed outward and vertical to the lamp.
(2) FIG. 18; At φ=0°, θ is scanned from −80° to +80°.
FIG. 19; At θ=0°, φ is scanned from −80° to +80°.
(3) Explanation; It can be seen from both graphs that peaks are observed in the direction θ0°, φ=+5°, i.e., roughly in front of the surface light source device. For each graph, the whole shape is roughly symmetrical about the peak and shows a hill-shaped profile having feet. However, the brightness levels outside θ=±50° in the plane parallel to the lamp are very low. Small ridged portions exist around φ=−40° in the plane vertical to the lamp.

It can be seen from the spread of each graph that the visual field in the plane parallel to the lamp and the visual field in the plane vertical to the lamp are both considerably narrow. That is, in the present example, it is obvious that narrowing of the visual field has been accomplished both in the plane parallel to the lamp and in the plane vertical to the lamp. The levels of brightness of the peaks are comparable to the level of Example 1. Consequently, considerable increase of the brightness has been achieved.

Figure 20:
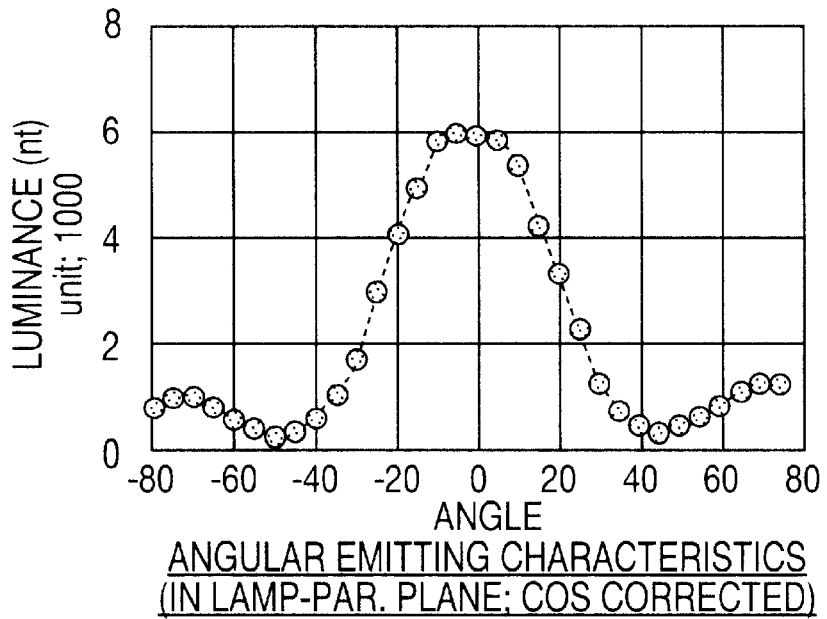
FIG. 20 is a graph showing the results of measurements of the emitting characteristics of Example 6 in a plane parallel to a lamp.
Figure 21:
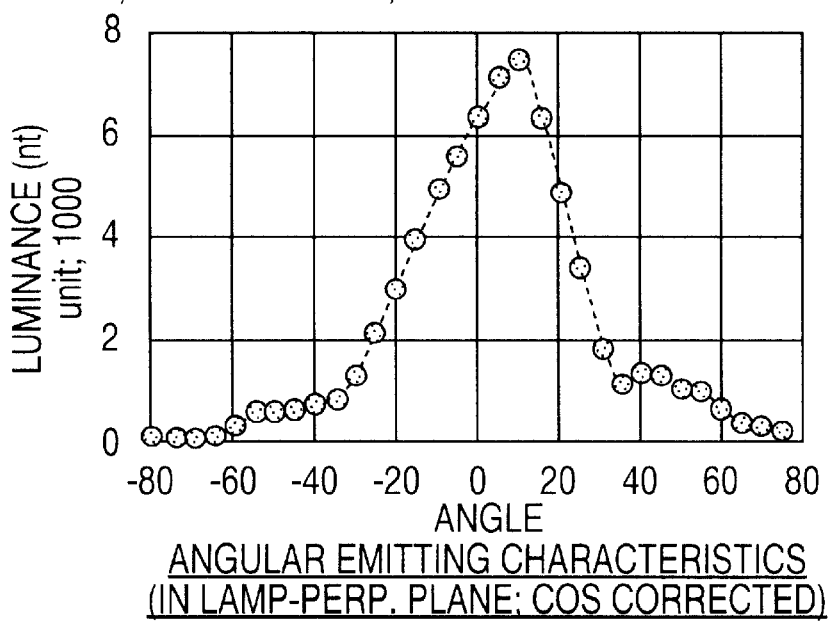
FIG. 21 is a graph showing the results of measurements of the emitting characteristics of Example 6 in a plane vertical to a lamp.

[Graphs of FIGS. 20 and 21; Example 6 (Group I)]
(1) PS1; prismatic vertical angle ψ=90°; the channels are directed outward and parallel to the lamp.
PS2; prismatic vertical angle ψ=90°; the channels are directed outward and vertical to the lamp.
(2) FIG. 20; At φ=0°, θ is scanned from −80° to +80°.
FIG. 21; At θ=0°, φ is scanned from −80° to +8°.
(3) Explanation; It can be seen from both graphs that peaks are observed in the direction θ=0°, φ=10°, i.e., peaks are observed roughly in front of the surface light source device. For each graph, the whole shape is roughly symmetrical about the peak and shows a hill-shaped profile having feet. However, small ridged portions exist around θ=±70° in the plane parallel to the lamp. Small ridged portions exist around φ=+40° in the plane vertical to the lamp.

It can be seen from the spread of each graph that the visual field in the plane parallel to the lamp and the visual field in the plane vertical to the lamp are both considerably narrow. That is, in the present example, it is obvious that narrowing of the visual field has been accomplished both in the plane parallel to the lamp and in the plane vertical to the lamp. The levels of brightness of the peaks are very high. That is, in the present example, increase of the brightness has been achieved to a very great extent.

Figure 22:
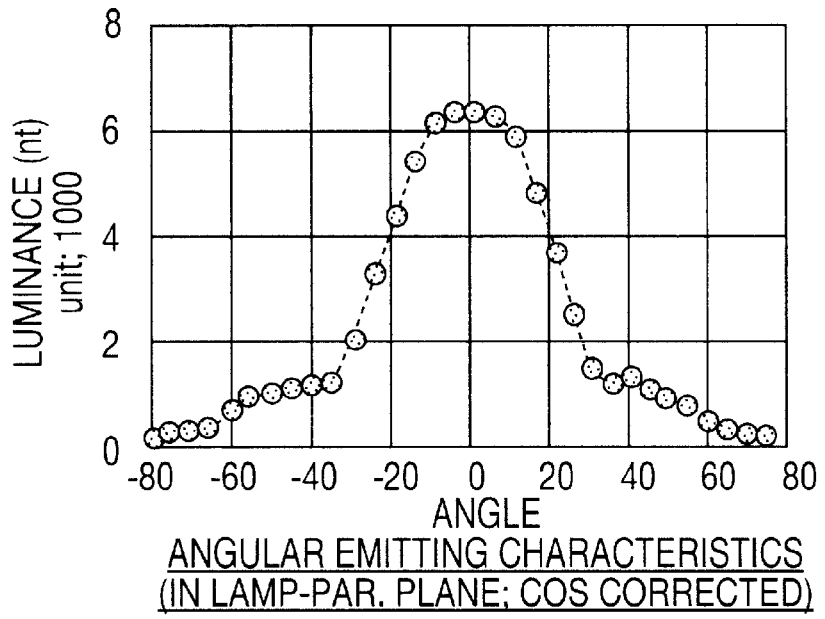
FIG. 22 is a graph showing the results of measurements of the emitting characteristics of Example 7 in a plane parallel to a lamp.
Figure 23:
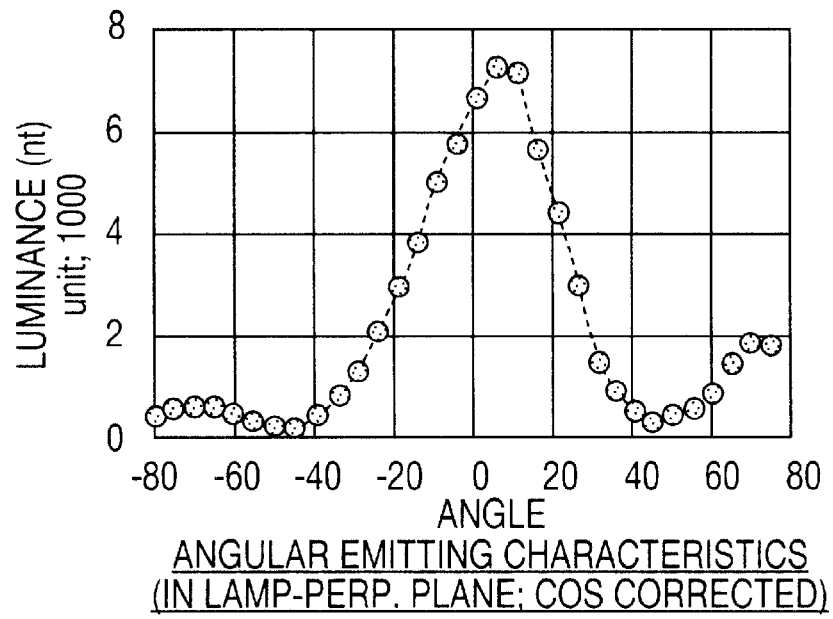
FIG. 23 is a graph showing the results of measurements of the emitting characteristics of Example 7 in a plane vertical to a lamp.

[Graphs of FIGS. 22 and 23; Example 7 (Group I)]
(1) PS1; prismatic vertical angle tψ=90°; the channels are directed outward and vertical to the lamp.
PS2; prismatic vertical angle ψ=90°; the channels are directed outward and parallel to the lamp.
(2) FIG. 22; At φ=0°, θ is scanned from −80° to +80°.
FIG. 23; At θ=0°, φ is scanned from −80° to +80°.
(3) Explanation; It can be seen from both graphs that peaks are measured in the direction θ=0°, φ=5°, i.e., peaks are observed roughly in front of the surface light source device. For each graph, the whole shape is roughly symmetrical about the peak and shows a hill-shaped profile having feet. However, small ridged portions exist around θ=+40° in the plane parallel to the lamp. Small ridged portions exist outside φ=±60° in the plane vertical to the lamp.

It can be seen from the spread of each graph that the visual field in the plane parallel to the lamp and the visual field in the plane vertical to the lamp are both considerably narrow. That is, in the present example, narrowing of the visual field in the plane parallel to the lamp is clear. Narrowing of the visual field in the plane vertical to the lamp is clearer. The levels of brightness of the peaks are very high. That is, in the present example, increase of the brightness has been achieved to a very great extent.

Figure 24:
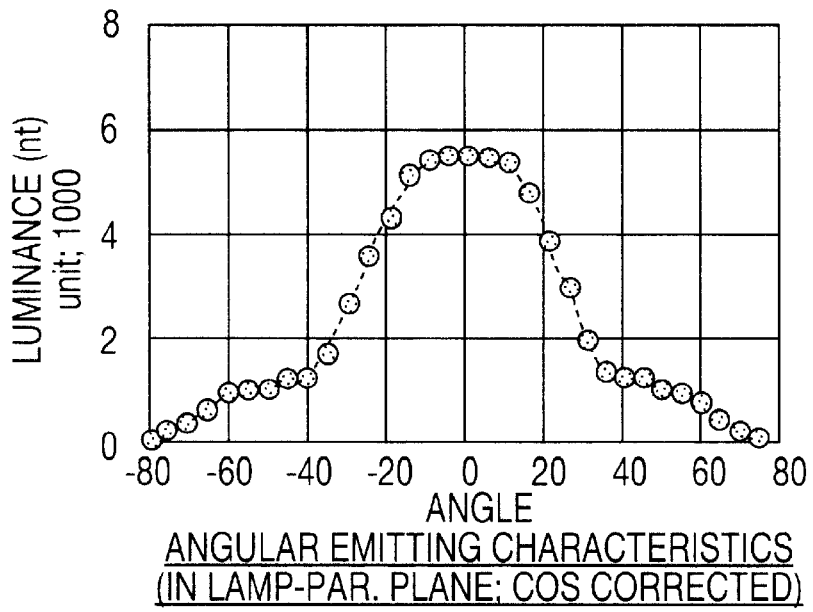
FIG. 24 is a graph showing the results of measurements of the emitting characteristics of Example 8 in a plane parallel to a lamp.
Figure 25:
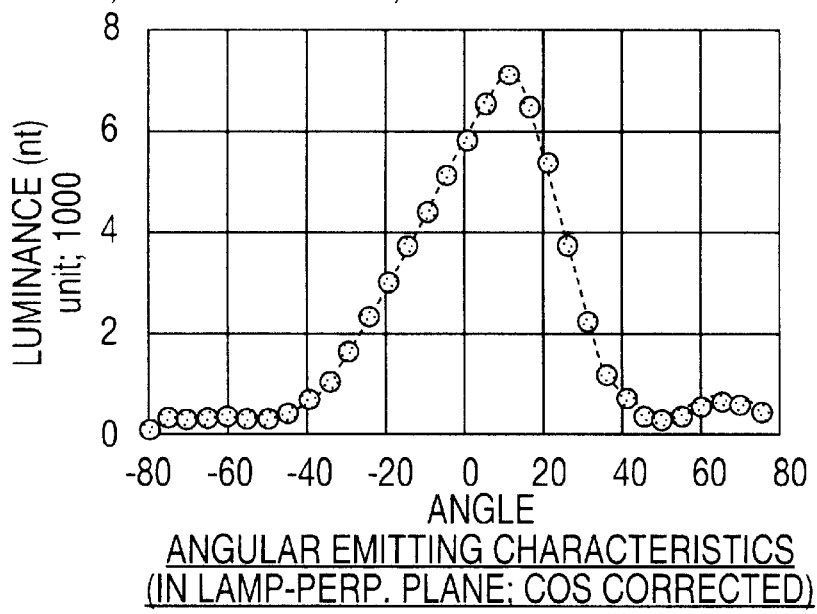
FIG. 25 is a graph showing the results of measurements of the emitting characteristics of Example 8 in a plane vertical to a lamp.

[Graphs of FIGS. 24 and 25; Example 8 (Group II)]
PS1; prismatic vertical angle ψ=90°; the channels are directed outward and vertical to the lamp.
PS2; prismatic vertical angle ψ=100°; the channels are directed outward and parallel to the lamp.
(2) FIG. 24; At φ=0°, θ is scanned from −80° to +80°.
FIG. 25; At θ=0°, φ is scanned from −80° to +80°.
(3) Explanation; it can be seen from both graphs that peaks are observed in the direction θ=0°, φ=10°, i.e., peaks are observed roughly in front of the surface light source device. For each graph, the whole shape is roughly symmetrical about the peak and shows a hill-shaped profile having feet. However, a flat portion is observed around the peaks (θ=around 0° to ±15°) in the plane parallel to the lamp. Small ridged portions exist around φ=+70° in the plane vertical to the lamp.

It can be seen from the spread of each graph that the visual field in the plane vertical to the lamp is considerably narrow but the visual field in the plane parallel to the lamp is not very narrow. That is, in the present example, narrowing of the visual field in the plane vertical to the lamp is clear but narrowing of the visual field in the plane vertical to lamp is not very clear. The levels of brightness of the peaks are very high. It is obvious that increase of the brightness has been accomplished.

Figure 26:
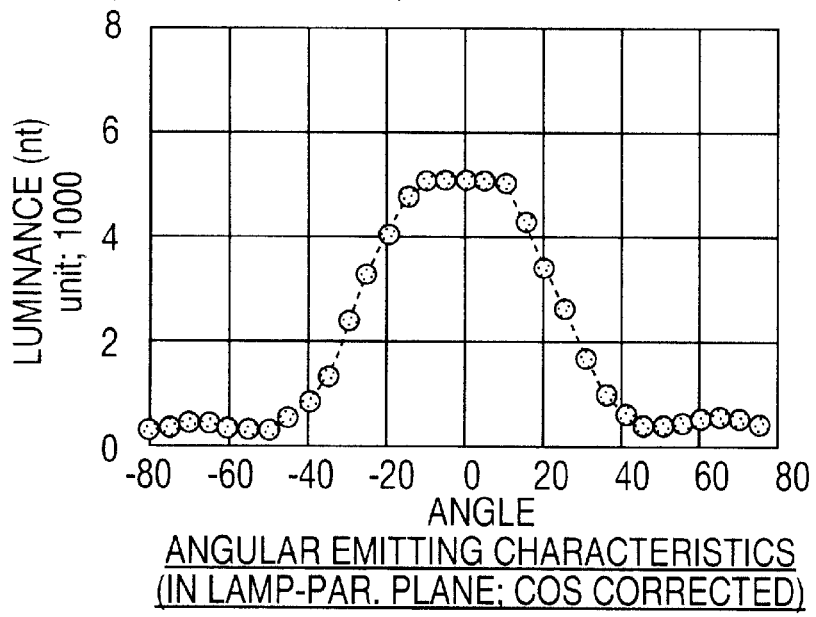
FIG. 26 is a graph showing the results of measurements of the emitting characteristics of Example 9 in a plane parallel to a lamp.
Figure 27:
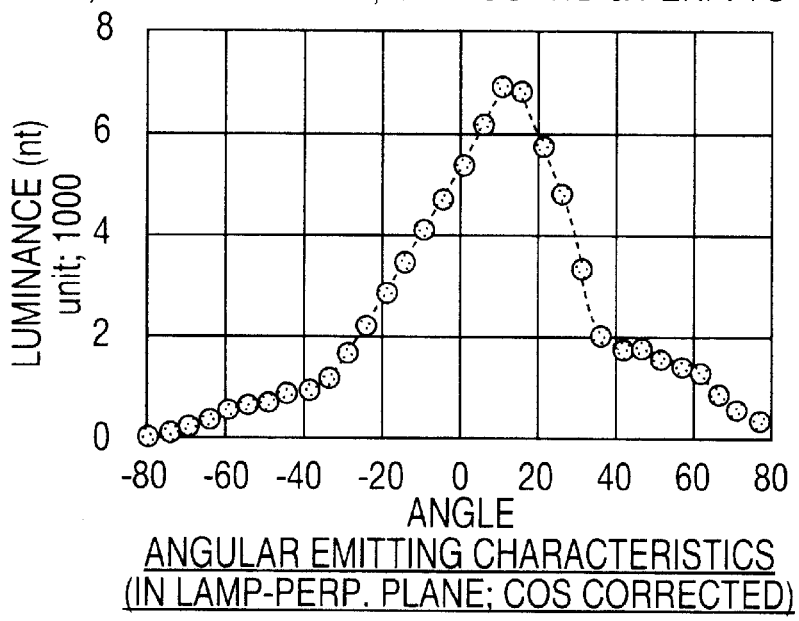
FIG. 27 is a graph showing the results of measurements of the emitting characteristics of Example 9 in a plane vertical to a lamp.

[Graphs of FIGS. 26 and 27; Example 9 (Group
(1) PS1; prismatic vertical angle ψ=90°; the channels are directed outward and parallel to the lamp.
PS2; prismatic vertical angle ψ=100°; the channels are directed outward and vertical to the lamp.

(2) FIG. 26; At ϕ=0°, θ is scanned from −80° to +80°.
FIG. 27; At θ=0°, ϕ is scanned from −80° to 80°.

(3) Explanation; It can be seen from both graphs that peaks are observed in the direction θ=5°, ϕ=10°, i.e., peaks are observed roughly in front of the surface light source device. For each graph, the whole shape is roughly symmetrical about the peak and shows a hill-shaped profile having feet. However, flat portions are observed around the peaks (θ=around 0° to ±10°) in the plane parallel to the lamp. Small ridged portions exist around ϕ=+70° in the plane parallel to the lamp.

It can be seen from the spread of each graph that the visual field in the plane vertical to the lamp is considerably narrow but the visual field in the plane parallel to the lamp is not very narrow. That is, the characteristics of the present invention are very similar to those of Example B. Narrowing of the visual field in the plane vertical to the lamp is considerably clear but narrowing of the visual field in the plane vertical to lamp is not very clear. The levels of brightness of the peaks are very high. It is obvious that increase of the brightness has been accomplished.

Figure 28:
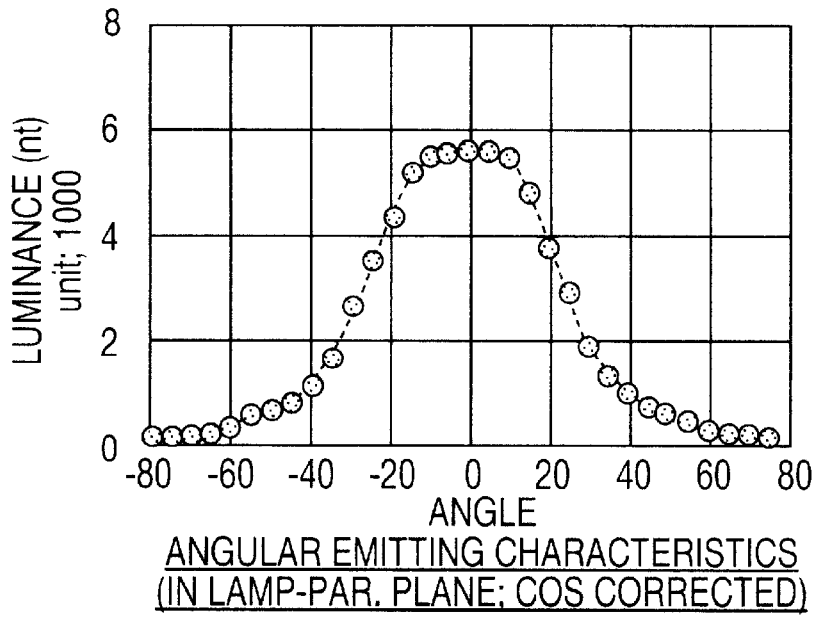
FIG. 28 is a graph showing the results of measurements of the emitting characteristics of Example 10 in a plane parallel to a lamp.
Figure 29:
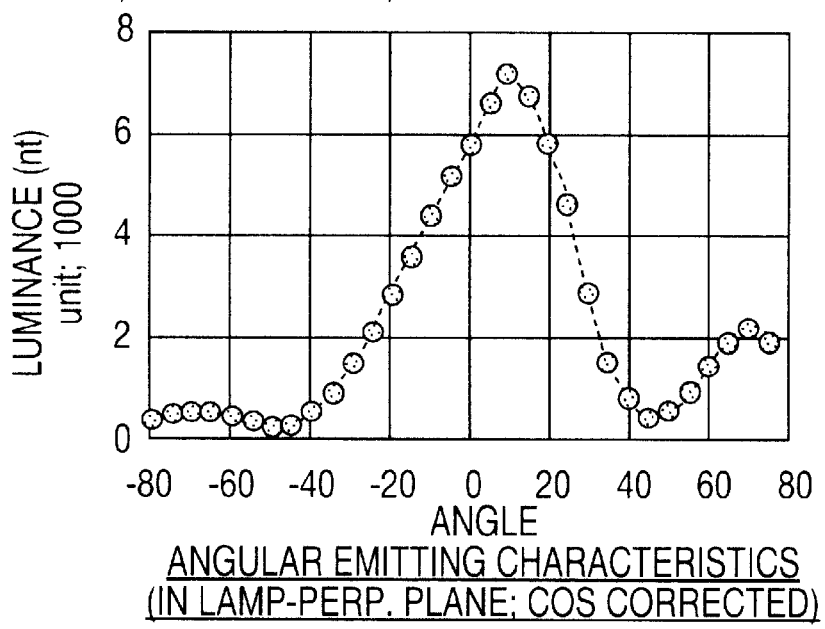
FIG. 29 is a graph showing the results of measurements of the emitting characteristics of Example 10 in a plane vertical to a lamp.

Graphs of FIGS. 28 and 29; Example 10 (Group (II)]
PS1; prismatic vertical angle ψ=100°; the channels are directed outward and vertical to the lamp.
PS2; prismatic vertical angle ψ=90°; the channels are directed outward and parallel to the lamp.

(2) FIG. 28; At ϕ0°, θ is scanned from −80° to +80°.
FIG. 29; At θ=0°, ϕ is scanned from −80° to (3) Explanation; It can be seen from both graphs that peaks are observed in the direction θ=−5°, ϕ=+10°, i.e., peaks are measured roughly in front of the surface light source device. For each graph, the whole shape is roughly symmetrical about the peak and shows a hill-shaped profile having feet. However, a flat portion is observed around the peaks (θ=around 0° to ±15°) in the plane parallel to the lamp. A rather great ridged portions exist around ϕ=+70° in the plane parallel to the lamp.

It can be seen from the spread of each graph that the visual field in the plane vertical to the lamp is considerably narrow but the visual field in the plane parallel to the lamp is not very narrow. That is, the characteristics of the present invention are also very similar to those of Example 8. Narrowing of the visual field in the plane vertical to the lamp is considerably clear but narrowing of the visual field in the plane vertical to lamp is not very clear. The levels of brightness of the peaks are very high. It is obvious that increase of the brightness has been accomplished.

Figure 30:
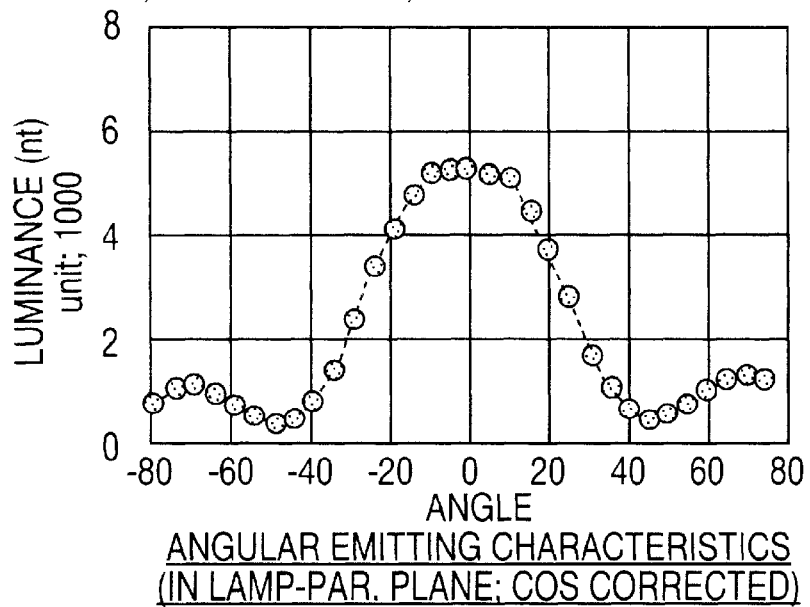
FIG. 30 is a graph showing the results of measurements of the emitting characteristics of Example 11 in a plane parallel to a lamp.
Figure 31:
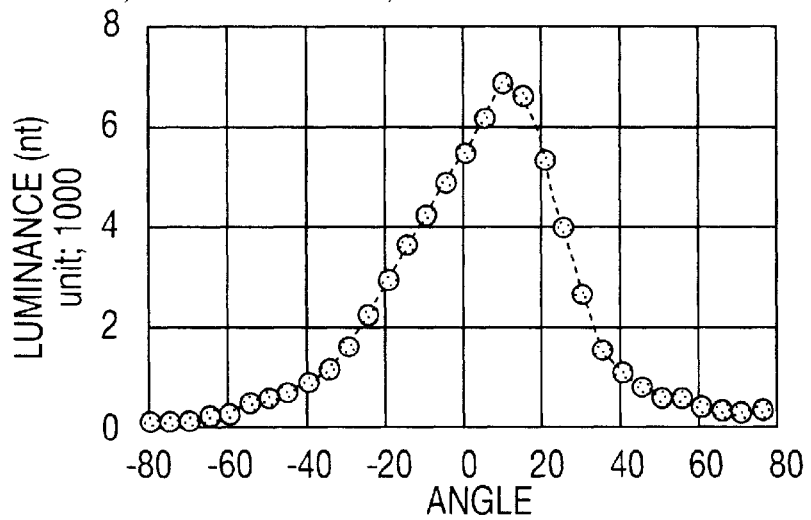
FIG. 31 is a graph showing the results of measurements of the emitting characteristics of Example 11 in a plane vertical to a lamp.

[Graphs of FIGS. 30 and 31; Example 11 (Group II)]
(1) PS1; prismatic vertical angle ψ=100°; the channels are directed outward and parallel to the lamp.
PS2; prismatic vertical angle ψ=90°; the channels are directed outward and vertical to the lamp.

(2) FIG. 30; At ϕ=0°, θ is scanned from −80° to +80°.
FIG. 31; At θ=0°, ϕ is scanned from −80° to +80°.

(3) Explanation; It can be seen from both graphs that peaks are observed in the direction θ=0°, =+10°, i.e., peaks are observed roughly in front of the surface light source device. For each graph, the whole shape is roughly symmetrical about the peak and shows a hill-shaped profile having feet. However, a flat portion is observed around the peaks (θ=around 0° to ±15°) in the plane parallel to the lamp. Small ridged portions exist around ϕ=±70° in the plane parallel to the lamp.

It can be seen from the spread of each graph that the visual field in the plane vertical to the lamp is considerably narrow but the visual field in the plane parallel to the lamp is not very narrow. That is, the characteristics of the present invention are also very similar to those of Example 8. Narrowing of the visual field in the plane vertical to the lamp is considerably clear but narrowing of the visual field in the plane vertical to lamp is not very clear. The levels of brightness of the peaks are very high. It is obvious that increase of the brightness has been accomplished.

The results of verifications of the performance, or narrowing of the visual field and increase of the brightness, of the eleven examples have been described thus far using data obtained by actual measurements. Similar measurements were also made under various prismatic vertical angle conditions. The results of the measurements are listed in Table 3, together with referential examples shown in the graphs of FIGS. 6 and This Table 3 shows configurations of prism sheets, the characteristics in the plane parallel to the lamp, the characteristics in the plane vertical to the lamp, data about the visual angle and, in the final column, total evaluations.

Figure 6:
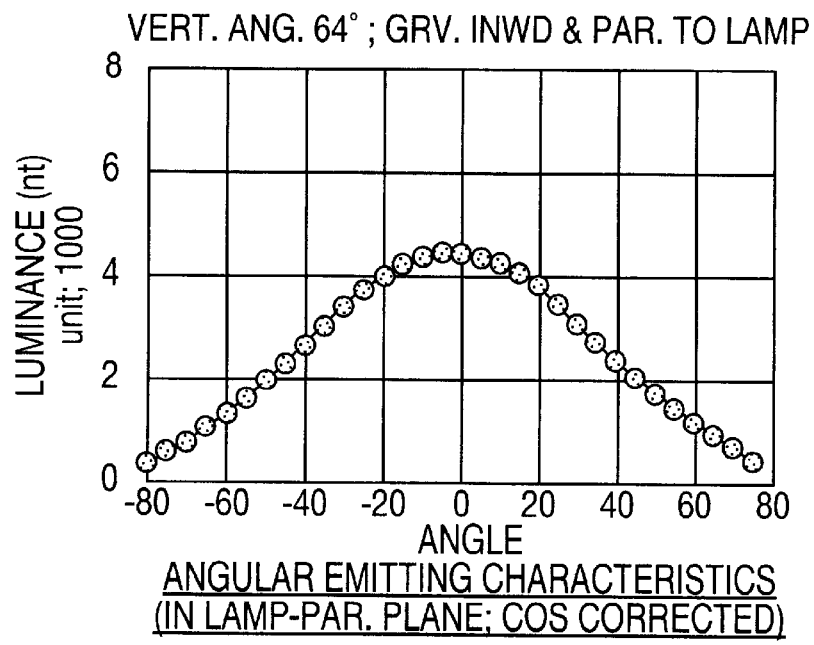
FIG. 6 is a graph showing results of measurements of emitting characteristics in a plane parallel to a lamp for a referential example in which a prism sheet having a prismatic vertical angle $\phi=64°$ is used singly and the channels are directed inward.
Figure 7:
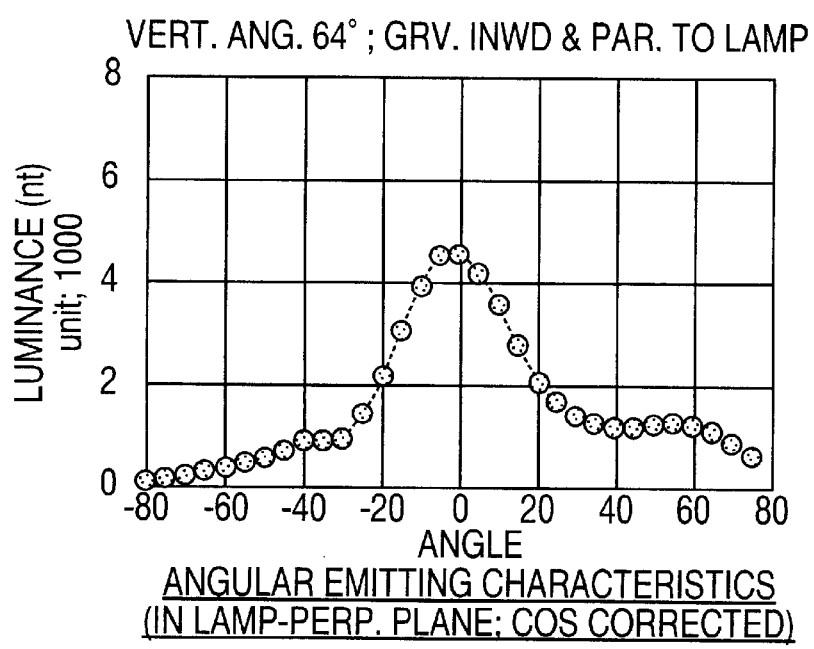
FIG. 7 is a graph showing results of measurements of emitting characteristics in a plane vertical to a lamp for a referential example in which only a prism sheet having a prismatic vertical angle $\phi=64°$ is used and the channels are directed inward.
Figure 8:
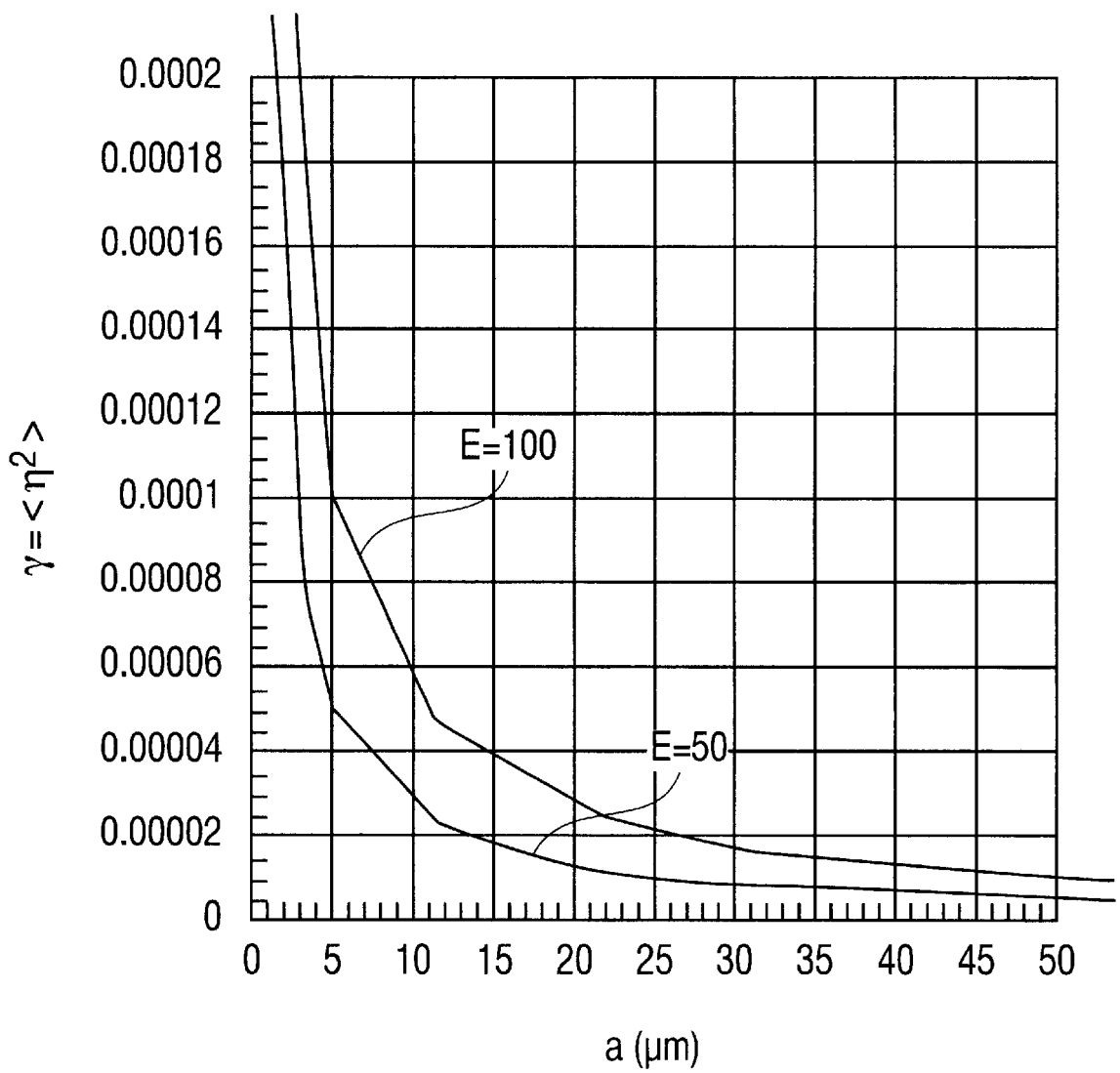
FIG. 8 is a graph showing curves expressing conditions in which the effective scattering irradiation parameter E is kept constant for cases of E=50 cm$^{-1}$ and E=100 cm$^{-1}$, in which the correlation distance a is plotted on the horizontal axis and the dielectric constant fluctuation squares mean τ is plotted on the vertical axis.
Figure 9:
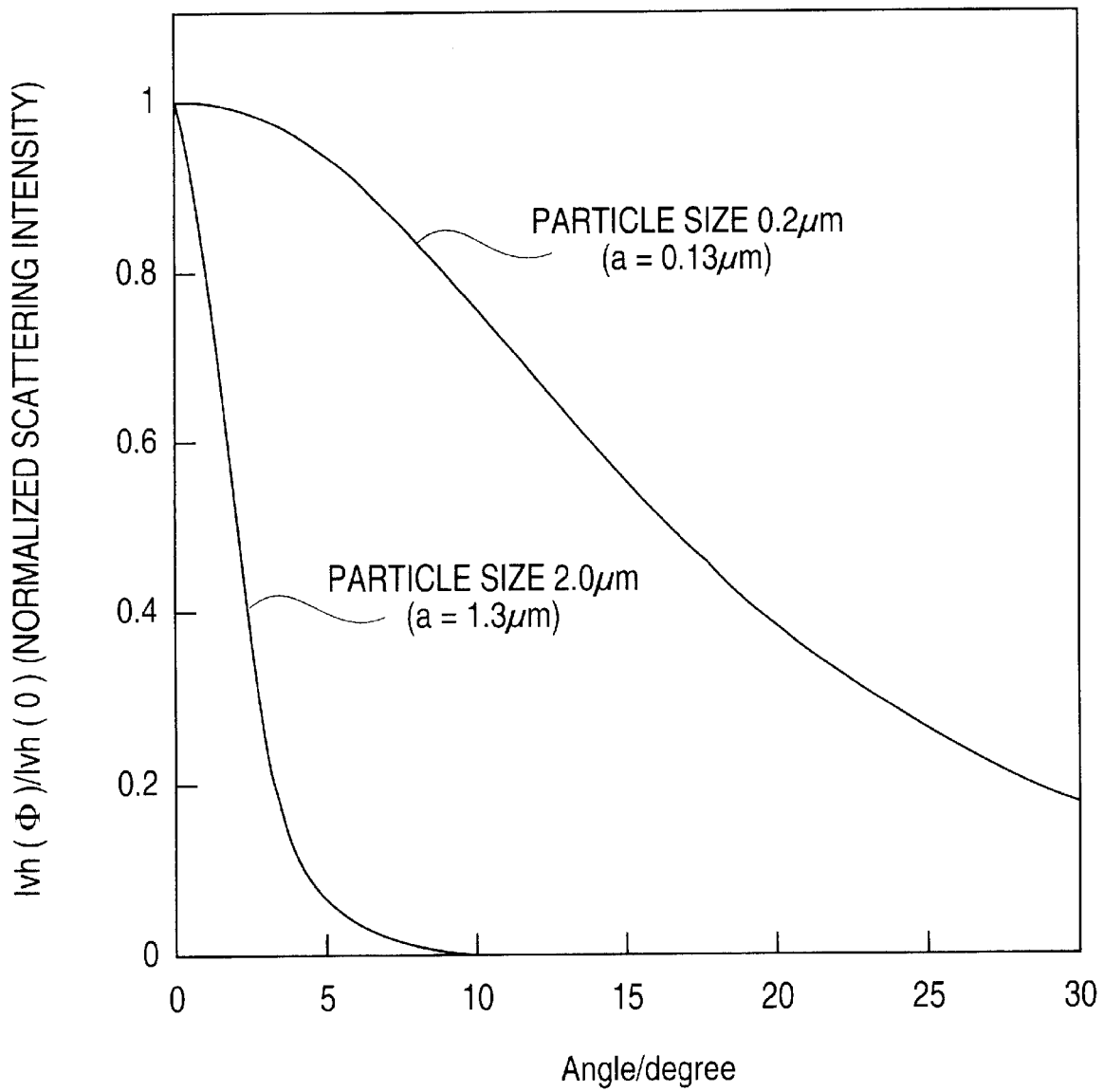

The evaluations were made based on the referential examples of FIGS. 6 and 7 in which a prism sheet having a prismatic vertical angle of 64° is singly disposed the inward. Narrowing of the visual field and increase of he brightness have been evaluated in terms of 4 levels (⊙, o, Δ, ×). The meanings of the symbols are as follows.

⊙: Conspicuous narrowing of the visual field has been achieved compared with the referential examples. Also, increase of the brightness is clear.

o: The level of achievement of narrowing of the visual field is secondary to the levels indicated by ⊙. Sufficient increase of the brightness has been accomplished.

Δ: Greater increase of the brightness is noticed than those of the referential examples. However, it cannot be said that narrowing of the visual field is conspicuous.

×: Either increase of the brightness or narrowing of the vis field is unsatisfactory and, totally saying, the performance is not worth highly mentioning.

TABLE 3

PERFORMANCE LIST OF FLUX COLLIMATION SURFACE LIGHT SOURCE DEVICE WITH PRISM SHEET ARRANGEMENT

| PRISM SHEET ARRANGEMENT | | LAMP-PARALLEL CHARACTERISTICS | | | LAMP-PERPENDICULAR CHARACTERISTICS | | | |
|---|---|---|---|---|---|---|---|---|
| 1st VERT. ANG. PAR./PERP. | 2nd VERT. ANG. PAR./PERP. | PEAK LUMINANCE (nt) | PEAK ANGLE (deg) | ANGULAR FIELD (deg) | PEAK LUMINANCE (nt) | PEAK ANGLE (deg) | ANGULAR FIELD (deg) | EVALUATION |
| 64° PAR. (INWD) | NONE | 4516 | 0 | ±44.4 | 4506 | 0 | ±18.4 | — |
| 70° PAR. | 70° PERP. | 3535 | −5 | ±23.5 | 3416 | −5 | ±29.3 | X |
| 70° PAR. | 80° PERP. | 4353 | 0 | ±29.5 | 5162 | +5 | ±21.3 | Δ |

TABLE 3-continued

PERFORMANCE LIST OF FLUX COLLIMATION SURFACE LIGHT SOURCE DEVICE WITH PRISM SHEET ARRANGEMENT

| PRISM SHEET ARRANGEMENT | | LAMP-PARALLEL CHARACTERISTICS | | | LAMP-PERPENDICULAR CHARACTERISTICS | | | |
|---|---|---|---|---|---|---|---|---|
| 1st VERT. ANG. PAR./PERP. | 2nd VERT. ANG. PAR./PERP. | PEAK LUMINANCE (nt) | PEAK ANGLE (deg) | ANGULAR FIELD (deg) | PEAK LUMINANCE (nt) | PEAK ANGLE (deg) | ANGULAR FIELD (deg) | EVALUA-TION |
| 70° PAR. | 90° PERP. | 5882 | 0 | ±20.8 | 6081 | 0 | ±18.9 | ○ |
| 70° PAR. | 100° PERP. | 4806 | 0 | ±23.6 | 5615 | +5 | ±21.8 | ○ |
| 70° PAR. | 110° PERP. | 4106 | +5 | ±32.2 | 6048 | +10 | ±17.8 | Δ |
| 70° PERP. | 70° PAR. | 2983 | −5 | ±40.1 | 3099 | −5 | ±25.7 | X |
| 70° PERP. | 80° PAR. | 3829 | 0 | ±25.5 | 4235 | +5 | ±27.8 | X |
| 70° PERP. | 90° PAR. | 5310 | 0 | ±20.2 | 5537 | 0 | ±22.6 | ○ |
| 70° PERP. | 100° PAR. | 4753 | 0 | ±25.9 | 5279 | +5 | ±24.0 | Δ |
| 70° PERP. | 110° PAR. | 3591 | +5 | ±28.4 | 4855 | +10 | ±25.3 | Δ |
| 80° PAR. | 90° PERP. | 4348 | −5 | ±29.3 | 5897 | +10 | ±25.9 | Δ |
| 80° PERP. | 90° PAR. | 4704 | +5 | ±32.7 | 6183 | +10 | ±22.0 | Δ |
| 90° PAR. | 70° PERP. | 5335 | 0 | ±16.5 | 5407 | 0 | ±17.8 | ◎ |
| 90° PAR. | 80° PERP. | 4070 | +5 | ±31.1 | 5564 | +10 | ±21.5 | Δ |
| 90° PAR. | 90° PERP. | 6021 | 0 | ±23.2 | 7297 | +10 | ±20.0 | ○ |
| 90° PAR. | 100° PERP. | 5148 | +5 | ±27.1 | 6838 | +10 | ±22.5 | Δ |
| 90° PAR. | 110° PERP. | 3929 | +15 | ±34.4 | 6100 | +15 | ±19.1 | Δ |
| 90° PERP. | 70° PAR. | 5951 | 0 | ±18.1 | 6180 | 0 | ±15.8 | ◎ |
| 90° PERP. | 80° PAR. | 4399 | 0 | ±28.0 | 5866 | +10 | ±24.2 | Δ |
| 90° PERP. | 90° PAR. | 6327 | 0 | ±23.4 | 7278 | +5 | ±19.3 | ○ |
| 90° PERP. | 100° PAR. | 5573 | 0 | ±28.1 | 7079 | +10 | ±21.2 | Δ |
| 90° PERP. | 110° PAR. | 4154 | 0 | ±30.1 | 6345 | +15 | ±22.3 | Δ |
| 100° PAR. | 90° PERP. | 5195 | −5 | ±27.2 | 6751 | +10 | ±21.7 | Δ |
| 100° PERP. | 90° PAR. | 5631 | 0 | ±27.0 | 7183 | +10 | ±21.3 | Δ |
| 100° PERP. | 100° PAR. | 4478 | 0 | ±31.0 | 6269 | +15 | ±22.4 | Δ |
| 110° PAR. | 90° PERP. | 4080 | +10 | ±30.2 | 6019 | +15 | ±24.8 | Δ |
| 110° PERP. | 90° PAR. | 4314 | +10 | ±35.0 | 6598 | +15 | ±19.5 | Δ |

The results of these total evaluations are consistent many matters described thus far and sufficiently support the validity of the conditions (especially, for prism vertical angle φ) for narrowing of the visual field or increase of the brightness.

The primary light beam source for supplying primary light beam to the prism sheets is preferably a surface light source means comprising one lamp and a wedge-shaped light scattering guide with emitting directivity as used in the examples. It is to be noted that the primary light beam source is not always limited to this means. For example, long tubular lamps may be disposed along the end surfaces of the both sides a flat guide plate with emitting directivity. In this case, the output characteristics will correspond to superposed characteristics of a pair of single-light source means.

In any of the described examples, if a liquid crystal display panel is disposed in the passage of light flux produced from the novel surface light source device, it is obvious that a liquid crystal display having a viewing screen either observed at a narrow visual angle or having high brightness is constructed. In this case, it is desired to select the characteristics of the narrowed visual field or increased brightness of the backlighting arrangement according to the desired characteristics of the liquid crystal display.

Finally, the materials of the prism sheets and of the light scattering guide used in the present invention and the method of fabricating them are described.

Various polymer-based materials may be used for the prism sheets and for light scattering guide used in the present invention. Representative examples include PMMA (polymethyl-methacrylate), PSt (polystyrene) and PC (polycarbonate) as listed in Tables 1 and 2.

Since the prism sheets are usually transparent, their material can be employed as it is. The V-shaped channels which give desired prismatic vertical angles may be formed by well-known plastic film molding techniques.

The light scattering guide may be fabricated from a polymer material by the following method, whether scattering power is imparted to the prism sheets or not.

One method employs a molding process including kneading two or more polymers.

In particular, two or more polymer materials of different refractive indices are mixed, heated, and kneaded together. The polymer materials can take any desired form. Industrially available polymer materials may be in the form of pellets. The kneaded material in a liquid phase is injected into the mold of an injection molding machine under a high pressure. The material is cooled and solidified. The molded light scattering guide is taken out of the mold. As a result, the light scattering guide has a shape conforming to the shape of the mold.

The kneaded polymers of different refractive indices solidify without being completely mixed, thereby rendering local concentrations nonuniform (fluctuated) to give a uniform scattering power. If the kneaded material is injected into the cylinder of an extrusion molding machine and extruding the material in a conventional manner, then molded article can be obtained.

The combinations of these polymers and their ratios of mixture can be selected in a very wide choice. They may be determined by taking account of the refractive index difference, the strength of refractive index nonuniform structures a produced through the molding process, and the properties (e.g., the scattering irradiation parameter E, the correlation distance a and the dielectric constant fluctuation squares mean τ) of the refractive index nonuniform structures. Representative usable polymer materials are listed in Tables 1 and 2.

Another method of forming a material of the light scattering guide is to uniformly disperse a particle material different in refractive index to produce a refractive index difference (more than 0.001) in a polymer material.

One available method of uniformly dispersing a particle material is known as suspension polymerization. In particular, the particle material is mixed into a monomer and undergoes polymerization while suspended in a hot water. As a result, a polymer material in which the particle material is uniformly dispersed can be obtained.

If this material is molded, a light scattering guide of desired shape can be manufactured.

Furthermore, light scattering guides of various characteristics can be manufactured by executing suspension polymerization for various particle materials and monomers (various combinations of particle concentrations, particle sizes, and refractive indices) to prepare various kinds of materials and then by selectively blending and molding them. Through an optical adding of a polymer containing no particle material, the particle concentration can be easily controlled.

A further available method of uniformly dispersing a particle material is to knead a polymer materials and particle material. Also in this case, kneading and pelletization processes are carried out with various combinations of particle materials and polymers (various combinations of particle concentrations, particle diameters, refractive indices, and so on). These materials are selectively mixed and then light scattering guides are molded. In this way, light scattering guides of varied characteristics can be obtained.

The aforementioned method of mixing polymers and the method of adding particle materials can be combined. For example, a particle material may be added to polymers of different refractive indices while they are mixed and kneaded. Since these methods are well known per se, detailed conditions for manufacturing and so forth are not described.

As described in detail thus far, according to the present invention, narrowing of the visual field of a surface light source device or increase of the brightness can be accomplished by using two prism sheets under certain conditions. Utilizing this, the viewing screen of a liquid crystal display is made brighter. Particularly, the present invention affords a surface light source device adapted for the backlighting arrangement of a liquid crystal display which is preferentially observed from directions in a narrow angular range.

What is claimed is:

1. A surface light source device comprising primary surface light source means, a first prism sheet and a second prism sheet;
   wherein said primary surface light source means has a wedge-shaped scattering guide plate provided with an incidence surface and an exit surface along which said first prism sheet is disposed, the scattering guide plate having a substantial and uniform scattering power inside to cause light introduced into the scattering guide plate through incidence surface thereof to be scattered within the scattering guide plate,
   said second prism sheet is disposed outside said first prism sheet so that one of said first and second prism sheets has a prism face formed by an array of V-shaped channels substantially parallel to said incidence surface and the other of said first and second prism sheets has a prism face formed by an array of V-shaped channels substantially perpendicular to said incidence surface;
   said first and second prism sheets having prismatic vertical angles approximately in the range of 70° to 110°, thereby narrowing visual field of illumination in two dimensions, and
   the prism faces of the first and second prism sheets being directed outward, away from the scattering guide plates.

2. The surface light source device of claim 1, wherein said first prism sheet has a prismatic vertical angle of about 90° and said second prism sheet has a prismatic vertical angle of about 70°.

3. The surface light source device of claim 2, wherein said primary surface light source means supplies directional light to said first prism sheet.

4. The surface light source device of claim 1, wherein said primary surface light source means supplies directional light to said first prism sheet.

5. A liquid crystal display having a surface light source device as a backlighting means:
   said surface light source device comprising primary surface light source means, a first prism sheet and a second prism sheet; wherein
   said primary surface light source means has a wedge-shaped scattering guide plate provided with an incidence surface and an exit surface along which said first prism sheet is disposed, the scattering guide plate having a substantial and uniform scattering power inside to cause light introduced into the scattering guide plate through incidence surface thereof to be scattered within the scattering guide plate,
   said second prism sheet is disposed outside said first prism sheet so that one of said first and second prism sheets has a prism face formed by an array of V-shaped channels substantially parallel to said incidence surface and the other of said first and second prism sheets has a prism face formed by an array of V-shaped channels substantially perpendicular to said incidence surface,
   said first and second prism sheets having prismatic vertical angles approximately in the range of 70° to 110°, thereby narrowing visual field of illumination in two dimensions, and
   the prism faces of the first and second prism sheets being directed outward, away from the scattering guide plates.

6. The liquid crystal display of claim 5, wherein said first prism sheet has a prismatic vertical angle of about 90° and said second prism sheet has a prismatic vertical angle of about 70°.

7. The liquid crystal display of claim 6, wherein said primary surface light source means supplies directional light to said first prism sheet.

8. The liquid crystal display of claim 5, wherein said primary surface light source means supplies directional light to said first prism sheet.

* * * * *

UNITED STATES PATENT AND TRADEMARK OFFICE
CERTIFICATE OF CORRECTION

PATENT NO. : 6,309,080 B1
DATED : October 30, 2001
INVENTOR(S) : Hiromi Sasako et al.

It is certified that error appears in the above-identified patent and that said Letters Patent is hereby corrected as shown below:

Title page,
Item [75], change "Saitama" to -- Hesuda --.
Item [73], change "Saitama" to -- Kawaguchi -- and change "Kanagawa" to
-- Yokohama --.

Column 1,
Line 25, change "plasm" to -- prism --.
Line 26, delete "light".

Column 2,
Line 39, change "100" to -- $\Phi$ --.

Column 3,
Line 16, change "$\Phi 4$" to -- $\Phi 1$ --.

Column 7,
Line 38, change "$(1 + \cos^2 \Phi)2$" to -- $(1 + \cos^2 \Phi)/2$ --.

Column 14,
Line 27, "Fig" begins a new paragraph.

Column 15,
Line 37, change "$\Phi 0°$" to -- $\Phi = 0°$ --.
Line 60, change "$+8°$" to -- $+80°$ --.

Column 16,
Line 39, insert -- (1) -- before "PS1".

Column 17,
Line 2, change "80°" to -- $+80°$ --.
Line 16, change "Example B" to -- Example 8 --.
Line 22, insert -- [ -- before "Graphs".
Line 23, insert -- (1) -- before "PS1".
Line 28, insert -- $+80°$ -- after "to".

UNITED STATES PATENT AND TRADEMARK OFFICE
CERTIFICATE OF CORRECTION

PATENT NO. : 6,309,080 B1
DATED : October 30, 2001
INVENTOR(S) : Hiromi Sasako et al.

It is certified that error appears in the above-identified patent and that said Letters Patent is hereby corrected as shown below:

Column 18,
Line 30, insert -- 7 -- after "and".
Line 51, change "vis" to -- visual --.

Signed and Sealed this

Sixteenth Day of April, 2002

Attest:

Attesting Officer

JAMES E. ROGAN
Director of the United States Patent and Trademark Office